(12) United States Patent
Yamada et al.

(10) Patent No.: US 11,677,894 B2
(45) Date of Patent: Jun. 13, 2023

(54) INFORMATION PROCESSING APPARATUS, IMAGE PROCESSING METHOD, AND MEDIUM

(71) Applicant: CANON KABUSHIKI KAISHA, Tokyo (JP)

(72) Inventors: Akitoshi Yamada, Kanagawa (JP); Kentaro Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/688,938

(22) Filed: Mar. 8, 2022

(65) Prior Publication Data

US 2022/0294934 A1 Sep. 15, 2022

(30) Foreign Application Priority Data

Mar. 11, 2021 (JP) .............................. JP2021-039529

(51) Int. Cl.
*H04N 1/64* (2006.01)
*H04N 1/58* (2006.01)

(52) U.S. Cl.
CPC .............. *H04N 1/648* (2013.01); *H04N 1/58* (2013.01)

(58) Field of Classification Search
CPC ................................. H04N 1/648; H04N 1/58
See application file for complete search history.

(56) References Cited

U.S. PATENT DOCUMENTS

| | | | |
|---|---|---|---|
| 5,883,984 A * | 3/1999 | Huang | G06T 5/20 382/274 |
| 6,191,874 B1 | 2/2001 | Yamada et al. | |
| 6,424,752 B1 | 7/2002 | Katayama et al. | |
| 6,549,681 B1 | 4/2003 | Takahashi et al. | |
| 6,608,926 B1 * | 8/2003 | Suwa | H04N 1/4074 358/522 |
| 6,621,921 B1 | 9/2003 | Matsugu et al. | |
| 6,694,051 B1 * | 2/2004 | Yamazoe | G06T 5/009 358/1.9 |
| 6,704,041 B2 | 3/2004 | Katayama et al. | |

(Continued)

FOREIGN PATENT DOCUMENTS

| | | | | |
|---|---|---|---|---|
| CA | 2 422 412 A | 4/2002 | | |
| CA | 2384485 C * | 2/2010 | ......... | B41J 2/04528 |

(Continued)

OTHER PUBLICATIONS

Co-Pending U.S. Appl. No. 17/688,993, filed Mar. 8, 2022.
Co-Pending U.S. Appl. No. 17/688,988, filed Mar. 8, 2022.

*Primary Examiner* — Ted W Barnes
(74) *Attorney, Agent, or Firm* — Venable LLP

(57) ABSTRACT

An information processing apparatus connected to an image forming unit that forms an image based on image data and a reading unit that reads an image as image data is provided. The apparatus acquires a pixel count of image data formed by pixels; encodes the at least one color component and the pixel count to be multiplexed on the image data; outputs the image data to the image forming unit; restores the multiplexed at least one color component and the multiplexed pixel count from the image data read by the reading unit; and replaces the pixels of the pixel count of a color component corresponding to the at least one color component included in the image data and restored from the image data.

21 Claims, 10 Drawing Sheets

(56) References Cited

U.S. PATENT DOCUMENTS

| | | | |
|---|---|---|---|
| 7,847,958 B2 * | 12/2010 | Ishikura | H04N 1/00875 358/1.14 |
| 7,924,469 B2 | 4/2011 | Ono et al. | |
| 7,944,588 B2 * | 5/2011 | Yamada | G06K 15/02 358/1.9 |
| 8,102,558 B2 | 1/2012 | Goto et al. | |
| 8,175,155 B2 | 5/2012 | Suwa et al. | |
| 8,199,339 B2 * | 6/2012 | Ihara | G06F 21/608 358/1.14 |
| 8,203,759 B2 | 6/2012 | Kato | |
| 8,237,991 B2 | 8/2012 | Ono et al. | |
| 8,295,598 B2 * | 10/2012 | Inoue | G09G 5/393 382/173 |
| 8,300,925 B2 * | 10/2012 | Kunieda | G06T 1/0028 382/209 |
| 8,339,668 B2 | 12/2012 | Kato | |
| 8,405,876 B2 | 3/2013 | Nakatani et al. | |
| 2003/0059085 A1 * | 3/2003 | Miyake | G06T 1/0071 382/232 |
| 2003/0063319 A1 * | 4/2003 | Umeda | H04N 1/32352 358/1.14 |
| 2003/0138143 A1 * | 7/2003 | Noguchi | G06T 5/007 382/167 |
| 2004/0120544 A1 * | 6/2004 | Eguchi | G06T 1/0078 382/100 |
| 2008/0062483 A1 * | 3/2008 | Morimoto | H04N 1/56 358/530 |
| 2008/0218806 A1 * | 9/2008 | Yokokura | H04N 1/32144 358/3.28 |
| 2009/0086242 A1 * | 4/2009 | Kato | H04N 1/60 358/1.13 |
| 2009/0210715 A1 * | 8/2009 | Izu | G06F 21/64 713/176 |
| 2012/0162677 A1 * | 6/2012 | Kato | H04N 1/40 358/1.9 |
| 2012/0229867 A1 * | 9/2012 | Takagi | H04N 1/32325 358/3.28 |
| 2012/0268759 A1 | 10/2012 | Ono et al. | |
| 2013/0050764 A1 * | 2/2013 | Zhan | H04N 1/403 382/176 |
| 2017/0214829 A1 * | 7/2017 | Nakabayashi | H04N 1/00846 |
| 2019/0005601 A1 * | 1/2019 | Ishida | H04N 1/54 |

FOREIGN PATENT DOCUMENTS

| | | | | |
|---|---|---|---|---|
| JP | 2002142128 A | * | 5/2002 | H04N 1/62 |
| JP | 2008-186165 A | | 8/2008 | |
| JP | 4187749 B2 | * | 11/2008 | G06T 1/0042 |
| JP | 4187749 B2 | | 11/2008 | |
| JP | 5180551 B2 | * | 4/2013 | H04N 1/32144 |
| JP | 5180551 B2 | | 4/2013 | |
| JP | 2021027434 A | * | 2/2021 | |

* cited by examiner

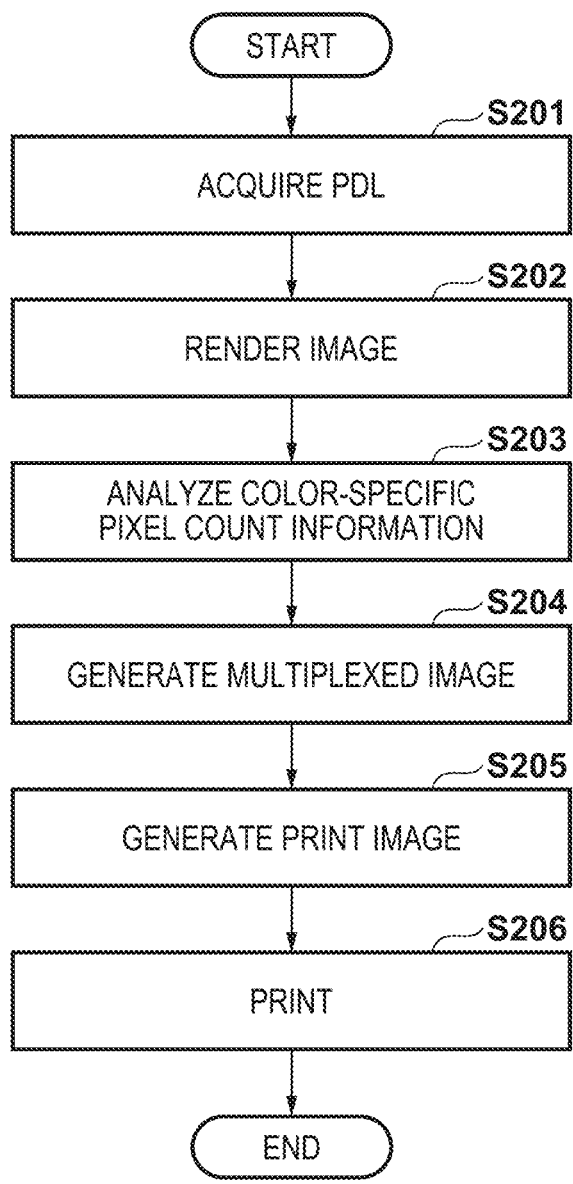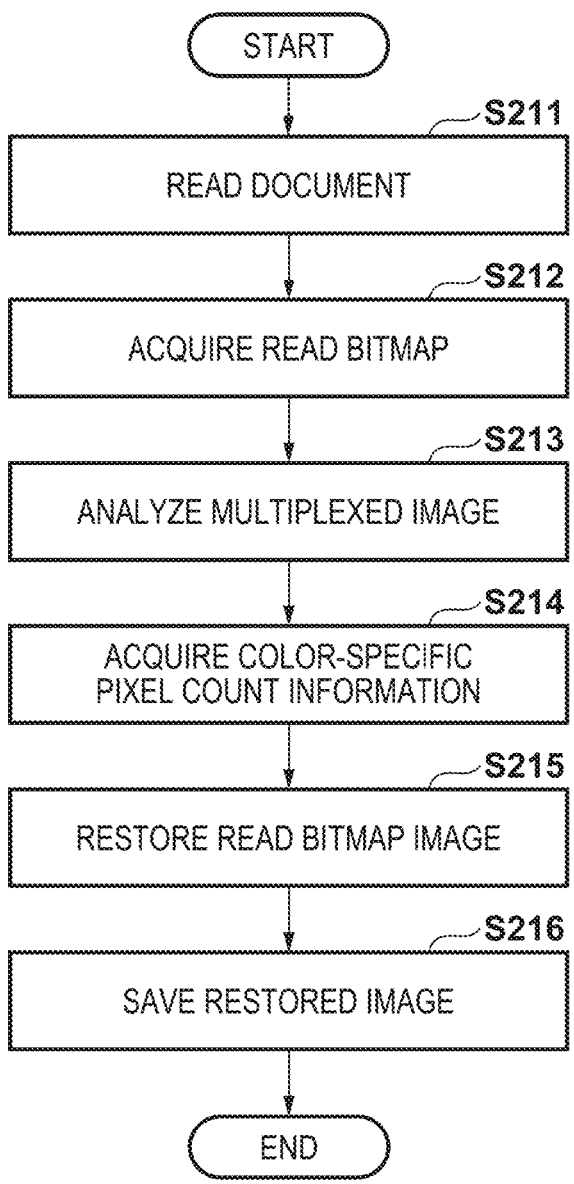

FIG. 6A
| 10 | 0 | 0 | -10 | -10 | 0 | 0 | 10 |
|---|---|---|---|---|---|---|---|
| 0 | 0 | -10 | -10 | 0 | 0 | 10 | 10 |
| 0 | -10 | -10 | 0 | 0 | 10 | 10 | 0 |
| -10 | -10 | 0 | 0 | 10 | 10 | 0 | 0 |
| -10 | 0 | 0 | 10 | 10 | 0 | 0 | -10 |
| 0 | 0 | 10 | 10 | 0 | 0 | -10 | -10 |
| 0 | 10 | 10 | 0 | 0 | -10 | -10 | 0 |
| 10 | 10 | 0 | 0 | -10 | -10 | 0 | 0 |
FIG. 6B
| 10 | 0 | 0 | -10 | -10 | 0 | 0 | 10 |
|---|---|---|---|---|---|---|---|
| 10 | 10 | 0 | 0 | -10 | -10 | 0 | 0 |
| 0 | 10 | 10 | 0 | 0 | -10 | -10 | 0 |
| 0 | 0 | 10 | 10 | 0 | 0 | -10 | -10 |
| -10 | 0 | 0 | 10 | 10 | 0 | 0 | -10 |
| -10 | -10 | 0 | 0 | 10 | 10 | 0 | 0 |
| 0 | -10 | -10 | 0 | 0 | 10 | 10 | 0 |
| 0 | 0 | -10 | -10 | 0 | 0 | 10 | 10 |
FIG. 7A
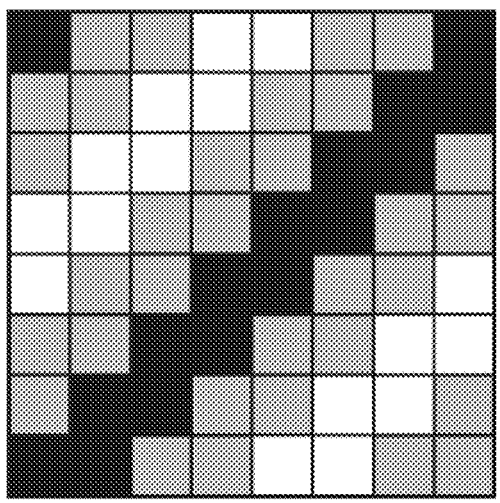
FIG. 7B
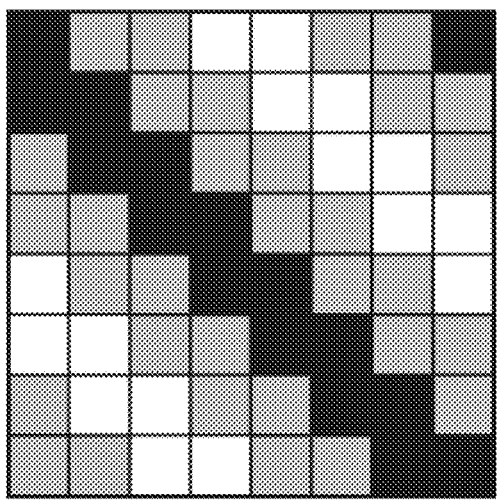
FIG. 8A
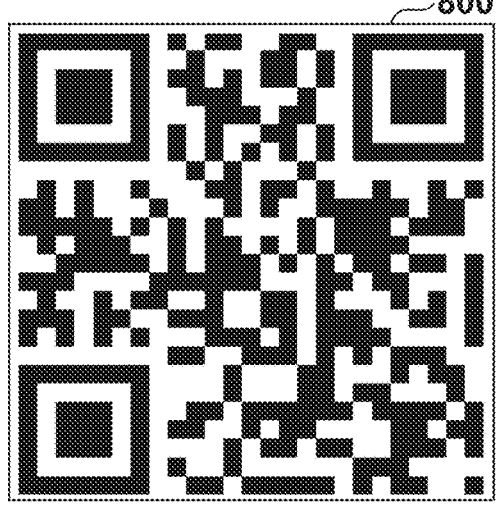
FIG. 8B
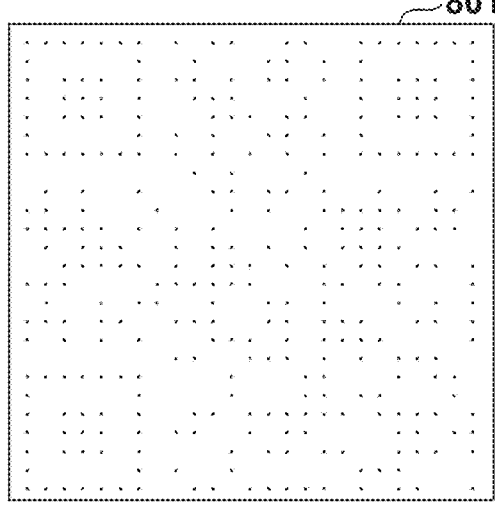

ANALYSIS RESULT MAP

INFORMATION PROCESSING APPARATUS, IMAGE PROCESSING METHOD, AND MEDIUM

BACKGROUND OF THE INVENTION

Field of the Invention

The present invention relates to, for example, an information processing apparatus, an image processing method, and a medium.

Description of the Related Art

Conventionally, there is known a scan function of reading, by a scanner, an output image obtained by printing a digital document by a printer, and saving the read digital document. At this time, it is known that the read digital document generated by performing a printing step and a scan step deteriorates in color and shape from the original digital document.

To cope with this, Japanese Patent No. 5180551 describes an example in which output image color is estimated in consideration of the output characteristics of a printer in addition to color information in a digital document, the estimated color is embedded as multiplexed information in a printed image, and the multiplexed information is extracted from a scanned image to restore color deterioration.

However, in Japanese Patent No. 5180551, color deterioration occurring in a printing step and a scan step, or caused by addition of data to the print document, a stain, or the like can be restored so as to become close to the state before deterioration but there is a concern about the shape restoration accuracy.

SUMMARY OF THE INVENTION

The present invention suppresses deterioration of a shape in a read digital document, caused by image formation on a medium.

The present invention has the following arrangement. According to an aspect of the present invention, provided is an information processing apparatus connected to an image forming unit configured to form an image based on image data and a reading unit configured to read an image as image data, the information processing apparatus comprising one or more processors and one or more memories comprising one or more programs, wherein the one or more programs are configured to cause the one or more processors to acquire a pixel count, concerning at least one color component, of image data formed by pixels, encode the at least one color component and the pixel count to be multiplexed on the image data, output the image data to the image forming unit, restore the multiplexed at least one color component and the multiplexed pixel count from the image data read by the reading unit, and replace, by pixels of the at least one color component restored from the image data, the pixels of the pixel count, restored from the image data, of a color component corresponding to the at least one color component included in the image data and restored from the image data.

According to another aspect of the present invention, provided is an information processing apparatus connected to an image forming unit configured to form an image based on image data, the information processing apparatus comprising one or more processors and one or more memories comprising one or more programs, wherein the one or more programs are configured to cause the one or more processors to acquire a pixel count, concerning at least one color component, of image data formed by pixels, encode the at least one color component and the pixel count to be multiplexed on the image data, and output the image data to the image forming unit.

According to still another aspect of the present invention, provided is an information processing apparatus connected to a reading unit configured to read, as image data, an image on which at least one color component and a pixel count of the color component are multiplexed, the information processing apparatus comprising one or more processors and one or more memories comprising one or more programs, wherein the one or more programs are configured to cause the one or more processors to restore the multiplexed at least one color component and the multiplexed pixel count from the read image data, and replace, by pixels of the at least one color component restored from the image data, the pixels of the pixel count, restored from the image data, of a color component corresponding to the at least one color component included in the image data and restored from the image data.

According to the present invention, it is possible to suppress deterioration of a shape in a read digital document, caused by image formation on a medium.

Further features of the present invention will become apparent from the following description of exemplary embodiments with reference to the attached drawings.

BRIEF DESCRIPTION OF THE DRAWINGS

FIGS. 2A and 2B are flowcharts for explaining a PDL multiplexed printing procedure and a multiplexed PDL extraction procedure, respectively, according to the first embodiment;

FIGS. 6A and 6B are views for explaining masks for generating an image variation by PDL multiplexing;

FIGS. 7A and 7B are views for explaining patterns formed by PDL multiplexing;

FIGS. 8A and 8B are views showing another example of multiplexing;

DESCRIPTION OF THE EMBODIMENTS

Figure 1:
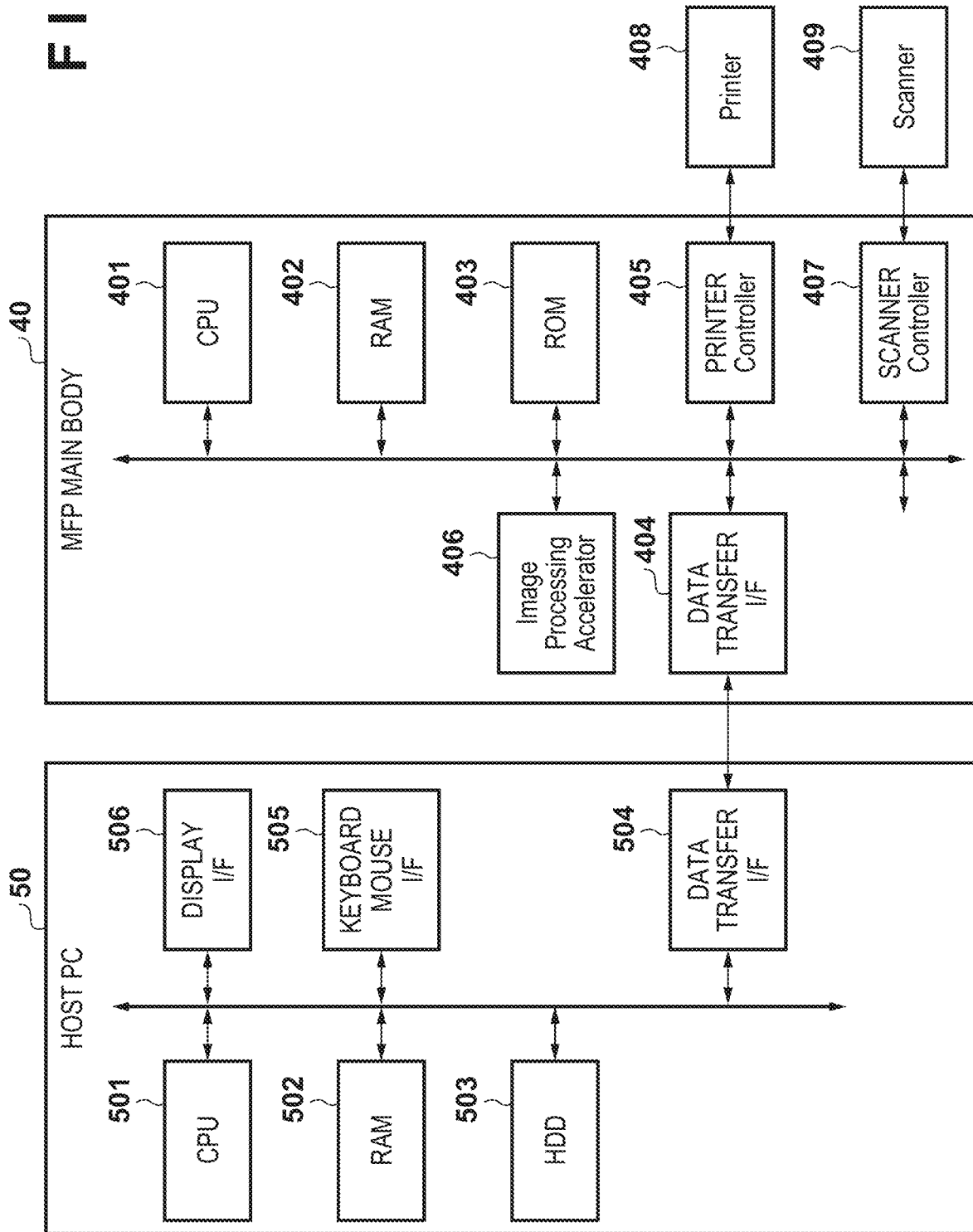
FIG. 1 is a block diagram of a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing the configuration of a printing system according to the present invention. As shown in FIG. 1, a printing apparatus is formed by including an MFP (Multi Function Printer) (multifunction copying machine or a digital multifunction peripheral) main body 40 and a personal computer (PC) 50 as a host apparatus. The MFP main body indicates a printer having, in the main body, a plurality of functions such as a printer function and a scanner function, and often has a copy function implemented by making both the functions cooperate with each other.

The host PC 50 is formed mainly by the following elements. A CPU 501 executes processing according to a program held in an HDD 503 or a RAM 502. The RAM 502 is a volatile storage, and temporarily holds a program and data. The HDD 503 is a nonvolatile storage, and holds a program and data. A data transfer I/F (data transfer interface) 504 controls data transmission/reception to/from the MFP main body 40. As a connection method for the data transmission/reception, wired connection such as USB, IEEE1394, or LAN, or wireless connection such as Bluetooth or WiFi can be used. A keyboard mouse I/F (keyboard mouse interface) 505 is an I/F for controlling an HID (Human Interface Device) such as a keyboard and a mouse, and the user can input data via this I/F. A display I/F (display interface) 506 controls display on a display (not shown).

On the other hand, the MFP main body 40 is formed mainly by the following elements. In accordance with a program held in a ROM 403 or a RAM 402, a CPU 401 executes processing of each of embodiments to be described later with reference to FIG. 3 and subsequent drawings. The RAM 402 is a volatile storage, and temporarily holds a program and data. The ROM 403 is a nonvolatile storage, and can hold table data and a program to be used in the processing of each of the embodiments to be described later with reference to FIG. 3 and the subsequent drawings.

A data transfer I/F (data transfer interface) 404 controls data transmission/reception to/from the PC 50. A printer controller 405 controls a printer unit 408 including a printhead. The printer controller 405 includes a head controller. The head controller controls a heating operation of a heater mounted on a head based on print data with respect to the printhead of the printer unit 408, thereby discharging ink. This forms an image on a medium. More specifically, the head controller can be configured to load control parameters and print data from a predetermined address in the RAM 402. Then, when the CPU 401 writes the control parameters and print data at the predetermined address in the RAM 402, the printer controller 405, more particularly, the head controller activates processing to perform the heating operation of the heater mounted on the printhead.

An image processing accelerator 406 is formed by a hardware component, and executes image processing at a higher speed than the CPU 401. More specifically, the image processing accelerator 406 can be configured to load parameters and data necessary for image processing from a predetermined address in the RAM 402. Then, when the CPU 401 writes the parameters and data at the predetermined address in the RAM 402, the image processing accelerator 406 is activated to perform predetermined image processing. Note that the image processing accelerator 406 is not always required, and may execute the table parameter creation processing and the image processing only in the processing by the CPU 401 in accordance with the specifications of the printer, as a matter of course. A scanner controller 407 instructs a scanner unit 409 to transmit, to the scanner controller 407, light amount information acquired by capturing light irradiation on a document and reflected light by an image sensor such as a CCD. More specifically, when the CPU 401 writes the control parameters and the read data writing address at the predetermined address in the RAM 402, the scanner controller 407 activates processing. Then, light emission control of an LED mounted on the scanner unit 409, acquisition of the light amount information from the scanner unit 409, and write of the light amount information after the read data writing address in the RAM 402 are performed.

The printer controller 405 further includes a motor controller. The motor controller controls a motor operation with respect to a plurality of motor units (not shown) included in the printer unit 408. The motor is used to relatively move the above-described printhead with respect to a print sheet, and to relatively move the scanner unit 409 with respect to a read document. In addition, some MFPs may include a motor for maintenance of the printhead.

Multiplexing Processing of Pixel Count Information for Each Color

FIGS. 2A and 2B are flowcharts for respectively explaining a procedure (to also be simply referred to as multiplexed printing processing hereinafter) of executing printing by multiplexing pixel count information for each color and a procedure (to also be simply referred to as restoration processing hereinafter) of performing restoration by extracting the pixel count information for each color according to the first embodiment. Steps S201 to S206 of FIG. 2A correspond to the procedure of executing printing by multiplexing the pixel count information for each color, and steps S211 to S216 of FIG. 2B correspond to the procedure of performing restoration by extracting the pixel count information for each color. Both the processes are implemented when the CPU 401 of the MFP main body 40 executes the program stored in the memory such as the RAM 402. However, a printing operation in step S205 of FIG. 2A and a document read operation in step S211 of FIG. 2B may be executed by the MFP main body 40 and the remaining steps may be executed by the PC 50. The same applies to other embodiments. The multiplexed printing procedure shown in FIG. 2A will first be described.

In step S201, PDL document data is acquired. PDL is an abbreviation for Page Description Language, and is formed by a set of drawing commands on a page basis. The types of drawing commands are defined for each PDL specification. In this embodiment, the following five types are mainly used as examples. Values in brackets are parameters of a command, and X and Y represent the coordinates of a drawing position.

Command 1) DOT drawing command (X, Y, color, point size)
Command 2) LINE drawing command (X1, Y1, X2, Y2, color, line type, line width)
Command 3) BOX drawing command (X1, Y1, X2, Y2, color, painting shape)

Command 4) TEXT drawing command (X1, Y1, color, font information, character string information)
Command 5) IMAGE drawing command (X1, Y1, X2, Y2, image file information)
In addition, drawing commands such as a CIRCLE drawing command for drawing a circle are appropriately used in accordance with the application purpose.

As PDL generally used, there are provided PDF (Portable Document Format) proposed by Adobe, XPS proposed by Microsoft, and HP-GL/2 proposed by HP. The application range of the present invention is not limited to them.

Example of Page Description Language

Figure 3:
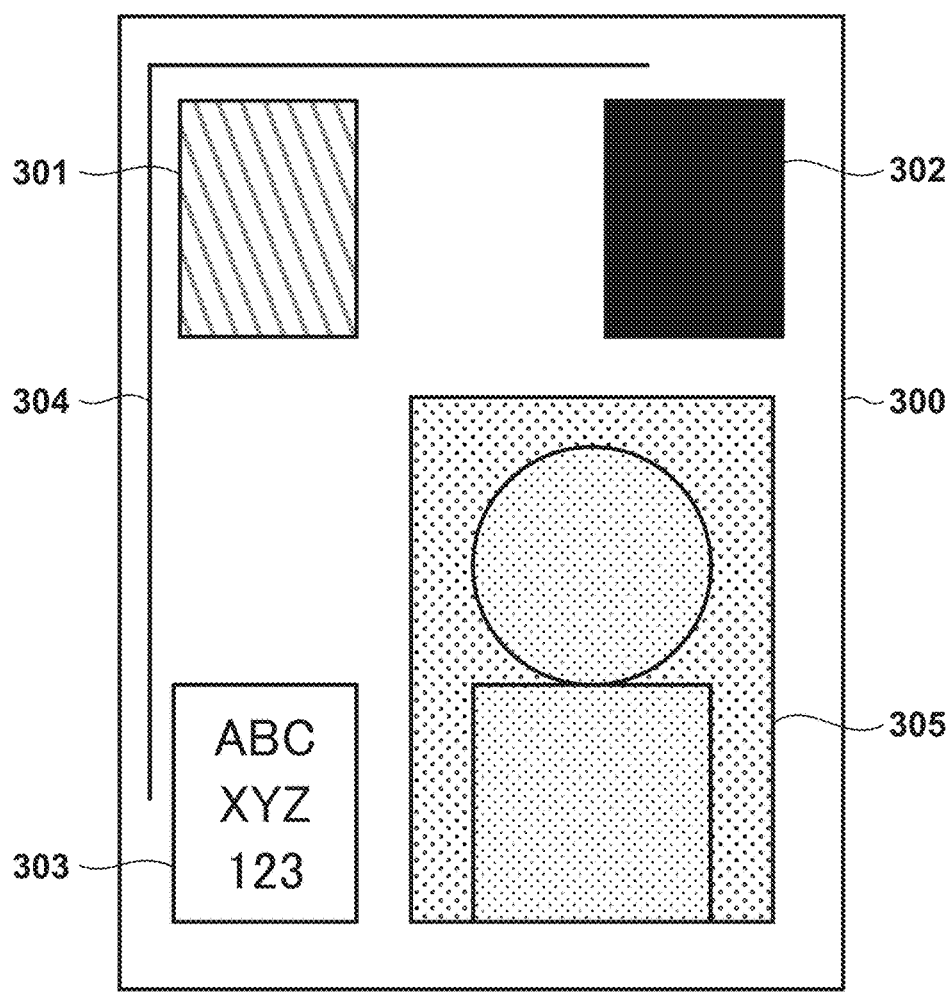
FIG. 3 is a view for explaining an example of a PDL document.

FIG. 3 shows an example of a PDL document. Referring to FIG. 3, reference numeral 300 denotes one page of a document, which has, for example, a width of 600 pixels and a height of 900 pixels as a pixel count. An example of PDL data corresponding to the document shown in FIG. 3 will be described below. Note that a PDL document is data described in PDL, and is also called document data or print data.

```
<PAGE=001>
    <BOX> 50, 75, 200, 300, GRAY, STRIPE </BOX>
    <BOX> 420, 75, 550, 300, BLACK, FULL </BOX>
    <BOX> 50,620, 200, 825, BLACK, NULL </BOX>
    <TEXT> 50,620, 200, 825, BLACK, STD-18, "ABCXYZ123" </BOX>
    <LINE> 25, 25, 25, 700, BLACK, PLAIN, 3 </LINE>
    <LINE> 25, 25, 450, 25, BLACK, PLAIN, 3 </LINE>
    <IMAGE> 250, 350, 550, 825, "PORTRAIT.jpg" </IMAGE>
</PAGE>
```

<PAGE=001> of the first row is a tag representing a page number according to this embodiment. Since PDL is normally designed to be able to describe a plurality of pages, a tag indicating a page break is described in PDL. In this example, a portion up to the </PAGE> tag of the ninth row represents the first page. In this embodiment, this portion corresponds to the document page 300 shown in FIG. 3. If there exists the second page, <PAGE=002> is described following the above PDL data.

A portion from the <BOX> tag to the </BOX> tag in the second row is a BOX drawing command, and corresponds to a box object 301 shown in FIG. 3. The first two coordinates indicate upper left coordinates (X1, Y1) as a drawing start point, and the following two coordinates indicate lower right coordinates (X2, Y2) as a drawing end point. Subsequently, GRAY (gray: R=128, G=128, B=128) is designated as a color, and STRIPE (stripe pattern) as a stripe pattern is designated as a painting shape. In this embodiment, a line in the lower right direction is always set with respect to the direction of the stripe pattern but the angle, cycle, and the like of a line may be designable in the BOX command.

The BOX drawing command of the third row corresponds to a box object 302 shown in FIG. 3. For this command, unlike the second row, BLACK (black: R=0, G=0, B=0) is designated as a color, and FULL (solid) as filling is designated as a painting shape.

The BOX drawing command of the fourth row and the TEXT drawing command of the fifth row correspond to an object 303 shown in FIG. 3. First, a frame around text is described by the BOX drawing command. In this example, NULL (blank) is designated as a painting shape in the BOX. The TEXT drawing command of the fifth row describes that a character font is "STD" (standard), a font size is 18 points, and a character string to be described is "ABCXYZ123".

Subsequently, the LINE drawing commands of the sixth and seventh rows correspond to a line object 304 shown in FIG. 3. A vertical line is drawn by the LINE drawing command of the sixth row. It is described that the type of the line to be drawn is PLAIN (solid line) and the width of the line to be drawn is 3 pixels. Similarly, a horizontal line is drawn by the LINE drawing command of the seventh row.

Subsequently, the IMAGE drawing command of the eighth row corresponds to an image object 305 shown in FIG. 3. It is described that the file name of an image existing in the region is "PORTRAIT.jpg", which indicates a JPEG file as a widespread image compression format.

Then, the </PAGE> tag of the ninth row indicates the end of drawing of the page.

As an actual PDL file, the "STD" font data and the "PORTRAIT.jpg" image file are often included in addition to the above-described drawing commands. This is because when the font data and the image file are managed separately, it is impossible to form the character and image portions only by the drawing commands, and information is insufficient to form the image shown in FIG. 3.

The PDL data acquired in step S201 of FIG. 2A has been explained.

Subsequently, the process advances to step S202, and rendering processing of the PDL document data acquired in step S201 is performed. This is a step of executing each drawing command described in the PDL data, and forming a bitmap image formed by color information for each pixel. In this embodiment, as described above, the image exemplified in FIG. 3 is formed. Since the document page 300 shown in FIG. 3 is formed with a width of 600 pixels and a height of 900 pixels, the bitmap image generated in this step is formed by 600×900 pixels. Each pixel is represented by 256 tones for R, G, and B components each formed by 8 bits.

In step S203, the color-specific pixel count information of the image formed in step S202 is analyzed. In this example, the number of colors existing in the document image and the pixel count or pixel ratio of each color are calculated.

Analysis of Color-Specific Pixel Count

Figure 5:
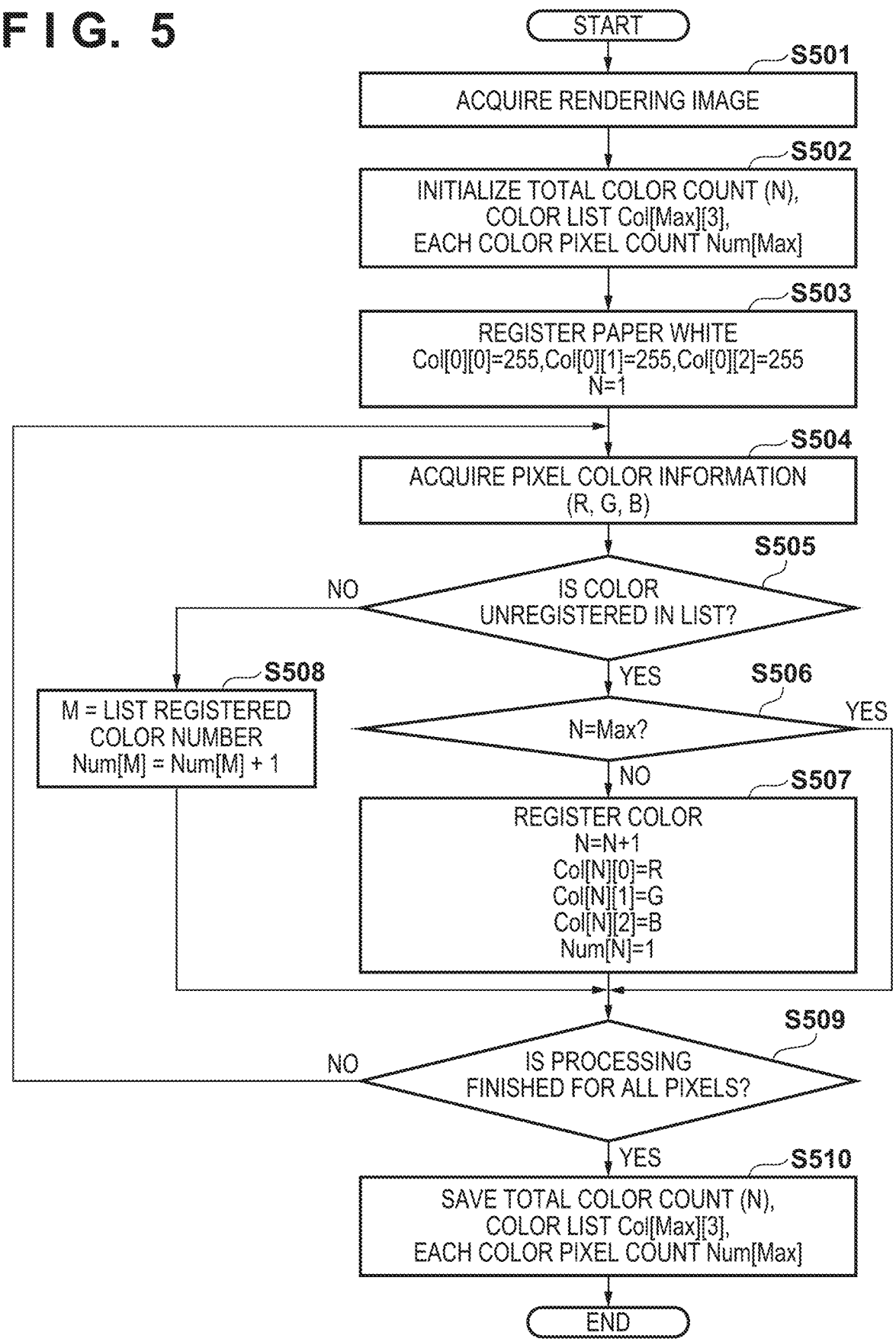
FIG. 5 is a flowchart for explaining a color-specific pixel count information analysis procedure according to the first embodiment.

FIG. 5 shows the detailed procedure of the color-specific pixel count information analysis processing.

In step S501, the rendering image rendered in step S202 of FIG. 2A is acquired.

Next, in step S502, variables such as a color-specific pixel count are initialized. The variables to be initialized are as follows.

| | |
|---|---|
| •Color list | Col[Max][3] |
| •Each color pixel count | Num[Max] |
| •Total color count | N |

The color list Col[Max][3] is a two-dimensional array of Max×3, where the first index represents a color list number and the second index represents a color component number. Max represents a predetermined constant of 2 or more, and corresponds to the maximum value of the number of colors that can be multiplexed. As Max is set to a larger value, more colors can be restored. Furthermore, "3" corresponds to the number of color elements, which is set to 3 since an example in which R, G, and B are color components is adopted. Each color pixel count Num[Max] is a one-dimensional array of Max×1, and represents the pixel count of each color. The total color count N represents the number of colors of the document image. The upper limit of N is Max. More specifically, in the initialization processing, all the variables are preferably set to 0 so the influence of the result of analysis performed in the past in another print job or the like is not received.

Next, in step S503, paper white is registered. More specifically, paper white (R=G=B=255) is registered in a color list number of 0, as follows.

| | | |
|---|---|---|
| •Total color count | N = 1 (only paper white is registered) | |
| •Color list | red of paper white | Col[0(paper white)][0(R)] = 255 |
| | green of paper white | Col[0(paper white)][1(G)] = 255 |
| | blue of paper white | Col[0(paper white)][2(B)] = 255 |

In this way, a color of RGB=255, 255, 255 is registered in a color list number (to also be referred to as a color number hereinafter) of 1, and the total number of registered colors is 1.

Subsequently, in step S504, pixel color information (R, G, B) is acquired for one pixel from the start position of the rendering image. This pixel is called a target pixel or a pixel of interest.

In step S505, it is determined whether the acquired pixel color information indicates a color unregistered in the color list. The determination processing can be performed for the current total color count N, as follows.

```
Result = "Yes"
For (M = 0; M < N; M++){
    If((R == Col[M][0])&&
    (G == Col[M][1])&&
    (B == Col[M][2])){Result = "No"}
}
```

That is, by sequentially focusing on the currently registered colors, it is determined whether the color is the same as the color of the pixel of interest. If the determination result is "NO", that is, if the color has been registered, the process advances to step S508.

In step S508, the pixel count of the registered color number M is updated. More specifically, the pixel count is incremented by:

Num[$M$]=Num[$M$]+1

Then, the process advances to step S509. On the other hand, if the determination result in step S505 is "YES", that is, if the color is unregistered, the process advances to step S506.

In step S506, it is determined whether the color unregistered in the list can be registered, that is, the current total color count N has reached the maximum number Max of colors that can be registered. If the determination result is "YES", the process advances to step S509; otherwise, the process advances to step S507.

In step S507, the new color is registered. More specifically, the following settings are made.

| | | |
|---|---|---|
| •Total color count | | N = N + 1 (1 is added to the total color count) |
| •Color list | red of paper white | Col[N(newly registered color number)][0(R)] = R |
| | green of paper white | Col[N(newly registered color number)][1(G)] = G |
| | blue of paper white | Col[N(newly registered color number)][2(B)] = B (the new color is added to the color list) |
| •Each color pixel count | | Num[N(newly registered color number)] = 1 (because of the pixel of the new color) |

In step S509, it is determined whether the determination processing ends for all the pixels of the rendering image. If the determination result is "NO", the process returns to step S504 to continue the processing by setting the next pixel of the current pixel of interest as a new pixel of interest. If the determination result is "YES", the process advances to step S510.

In step S510, the following color-specific pixel count information is saved, thereby ending the processing.

| | |
|---|---|
| •Total color count | N |
| •Color list | Col[N][3] |
| •Each color pixel count | Num[N] |

Referring back to FIG. 2, in step S204, a multiplexing image is created. This superimposes the color-specific pixel count information acquired in step S203 on the rendering image generated in step S202. This is done to make it possible to extract the color-specific pixel count information when scanning the print image, thereby obtaining a unit of performing restoration from deterioration in image shape to be described later with reference to FIGS. 4A and 4B. Note that if the multiplexing target image data is a color image, multiplexing is performed by targeting a specific color component. In this embodiment, for example, color-specific pixel count information (to also be referred to as pixel count information or additional information hereinafter) is multiplexed by targeting a B (blue) component, but another color component may be targeted.

Processing information by an information processing apparatus like a PC means processing binary data. Binary data includes pieces of information of "0" and "1", and has a specific meaning by continuously concatenating the pieces of information of "0" and "1". If, for example, information of "hello" is processed as binary data, "h" corresponds to binary data of "01101000" by exemplifying "Shift JIS" as one of character codes. Similarly, "e" corresponds to binary data of "01100101", "l" corresponds to binary data of "01101100" and "o" corresponds to binary data of "01101111". That is, the characters of "hello" can be expressed by binary data of "0110100001100101011011000110110001101111". Conversely, if binary data of "0110100001100101011011000110110001101111" can be acquired, characters of "hello" can be acquired. Based on this idea, multiplexing can be implemented by embedding data so as to determine "0" or To generate pieces of information of "0" and "1", that is, information to be multiplexed, two masks shown in FIGS. 6A and 6B are considered as an example. Each mask is a mask formed by 8 pixels×8 pixels, and it is possible to give a pattern having a cycle to a region of 8 pixels×8 pixels in an image by adding the contents of the corresponding mask to the image. This pattern represents 0 and 1. FIG. 6A shows the pattern indicating 0, and FIG. 6B shows the pattern indicating 1. A digital image is basically expressed by 8 bits for each color, and assigned with one of values of 0 to 255.

Since a value falling outside this range cannot be used as image data, if the calculation result of a pixel value is smaller than 0 or equal to or larger than 256, 0 or 255 is generally assigned to fall within the effective range. In the mask shown in FIG. 6A or 6B, a change of ±10 is given to the pixel value. However, if all the values of the image data in the mask region are 255, the values in the region after adding the mask fall within not a range of 245 to 265 but a range of 245 to 255. In this description, one color is represented by 8 bits but may be represented by another number of bits except for 8 bits, as a matter of course. When processing a digital image, the effective range exists regardless of the number of bits, and a change that makes a value fall outside the range is not applied. As shown in FIG. 6A or 6B, by performing masking processing for the PDL document image using the mask corresponding to 0 or 1, 1-bit information can be multiplexed on a region of 8×8 pixels.

FIGS. 7A and 7B each visually show a pattern to be given to the image by the mask. A position of "10" in the mask shown in FIG. 6A or 6B is expressed by black, a position of "0" is expressed by gray, and a position of "−10" is expressed by white. Thus, an oblique line shown in FIG. 7A or 7B appears in the image. In this way, a code (color component and pixel count) can be multiplexed, on the original image, as a high-frequency component which is difficult to visually recognize. A pseudo code for applying the mask shown in FIG. 6A or 6B to the overall image in correspondence with the code will now be described.

```
01:     int i, j, k, l;
02:     int width = 640, height=480;
03:     unsigned char *data = image data;
04:     int **maskA = mask data;
05:     bool isMaskA = true;
06:     for(j = 0; j < height; j+=8){
07:         for(i = 0; i < width; i+=8){
08:             for(k = 0; k < 8; k++){
09:                 for(l = 0; l < 8; l++){
10:                     if(isMaskA == true){
11:                         data[(i+k)+(j+l)*width] += maskA[k][l];
12:                     }
13:                 }
14:             }
15:         }
16:     }
```

The above code indicates a procedure of sequentially focusing on an 8×8 region by targeting image data of 640×480 pixels as an example, and adding, if the region is a region to be masked, the value of each pixel of the mask corresponding to each pixel of the region. The region to be masked is designated by isMaskA, and the mask to be applied is designated by maskA. In this way, information can be embedded by multiplexing using the above method. Note that a region where additional information is multiplexed may be referred to as a code region.

Using this multiplexing technique, the pixel count information of the image data, more specifically, the total color count N, the color list Col[N][3], and each color pixel count Num[N] saved in step S510 are multiplexed on the image data to be printed. These pieces of information may be multiplexed in a predetermined order by setting the predetermined position of the image as a base point. Alternatively, the multiplexed information may be multiplexed in association with information indicating contents. In consideration of deviation at the time of reading, a bit pattern indicating that the multiplexing region subsequently appears may be multiplexed immediately before the region where the pixel count information is multiplexed. The pixel count information to be multiplexed may be repeatedly multiplexed.

According to the above-described code, isMaskA is set to true for the region to be multiplexed, and is set to false for other regions. With respect to the region to be multiplexed, the mask shown in FIG. 6A is designated as maskA for the region on which "0" is multiplexed, and the mask shown in FIG. 6B is designated as maskA for the region on which "1" is multiplexed. The pixel count for each color of the image is multiplexed by performing the above operation in, for example, the raster scanning direction of the image. Note that multiplexing may be performed for a specific color.

Subsequently, the process advances to step S205, and print image is generated. In the print image generation operation, an arbitrary known method may be used but this embodiment will describe an example of using the following method. In this example, the following four processes are performed for each pixel of the multiplexed bitmap image generated in step S204 and formed by R, G, and B pixel values.

Color conversion
Ink color separation
Output characteristic conversion
Quantization Color conversion is processing of performing conversion so that RGB information of the multiplexed bitmap image can preferably be printed by the MFP main body 40. The reason for this is that as a color described in a drawing command of PDL, a color value which can preferably be expressed on a display is generally set, and when the value is output intact by a printer, a different color is undesirably output.

More specifically, to calculate a combination of preferred output pixel values (Rout, Gout, and Bout) for a combination of input pixel values (Rin, Gin, and Bin), a three-dimensional lookup table is used for each output color. Ideally, since each of the input values Rin, Gin, and Bin has 256 tones, a table Table1[256][256][256][3] having 16,777, 216 (=256×256×256) combinations of output values in total is prepared to obtain:

$$Rout=Table1[Rin][Gin][Bin][0]$$

$$Gout=Table1[Rin][Gin][Bin][1]$$

$$Bout=Table1[Rin][Gin][Bin][2]$$

Thus, color conversion can be implemented. Furthermore, a known contrivance to decrease a table size may be used. For example, the number of grids of the lookup table is decreased from 256 to, for example, 16, and an output value is decided by interpolating the table values of a plurality of grids.

Ink color separation is processing of converting the output values Rout, Gout, and Bout of the color conversion processing into output values of the respective ink colors of inkjet printing. This embodiment assumes 4-color inkjet printing of cyan, magenta, yellow, and black. There are various implementation methods for this conversion processing. In this embodiment, similar to the color conversion processing, a combination of preferred ink color pixel values (C, M, Y, and K) is calculated for the combination of the output pixel values (Rout, Gout, and Bout). To do this, a three-dimensional lookup table Table2[256][256][256][4] for each output color can be used to obtain:

$$C=Table2[Rout][Gout][Bout][0]$$

$$M=Table2[Rout][Gout][Bout][1]$$

$$Y=Table2[Rout][Gout][Bout][2]$$

$$K=Table2[Rout][Gout][Bout][3]$$

Thus, ink color separation can be implemented. Furthermore, a known contrivance to decrease a table size may be used.

Subsequently, in output characteristic conversion, the density of each ink color is converted into a printing dot count rate. More specifically, for example, the density of 256 tones for each color is converted into a dot count rate Cout, Mout, Yout, or Kout of 1,024 tones for each color. To do this, a two-dimensional lookup table Table3[4][256] in which a preferred printing dot count rate for the density of each ink color is set is used to obtain:

$C$out=Table3[0][$C$]

$M$out=Table3[1][$M$]

$Y$out=Table3[2][$Y$]

$K$out=Table3[3][$K$]

Thus, output characteristic conversion can be implemented. Furthermore, a known contrivance to decrease a table size may be used. For example, the number of grids of the lookup table is decreased from 256 to, for example, 16, and an output value is decided by interpolating the table values of a plurality of grids.

Subsequently, in quantization, the printing dot count rate Cout, Mout, Yout, or Kout of each ink color is converted into ON/OFF of an actual printing dot of each pixel. As a quantization method, an arbitrary method such as an error diffusion method or a dither method may be used. The dither method is exemplified to obtain:

$C$dot=Halftone[$C$out][$x$][$y$]

$M$dot=Halftone[$M$out][$x$][$y$]

$Y$dot=Halftone[$Y$out][$x$][$y$]

$K$dot=Halftone[$K$out][$x$][$y$]

Then, by performing comparison with a threshold corresponding to each pixel position, it is possible to implement ON/OFF of the printing dot of each color. In this example, the occurrence probability of each printing dot is Cout/1023, Mout/1023, Yout/1023, or Kout/1023.

Thus, the print image generation operation in step S203 ends.

Next, in step S206, the print image generated in step S205 is printed. Thus, the PDL document can be printed on a print sheet.

The above processing can print, on a print sheet, the PDL document on which the color-specific pixel count data is multiplexed. Referring to the pattern shown in FIG. 7A or 7B, the pattern is drawn by an oblique line of 2 px (pixels). Processing of generating a printed material based on a rendering image in which color-specific pixel count data is embedded is also called "multiplexing encoding processing". Note that pixel count information is multiplexed on an RGB image in the above example but pixel count information may be multiplexed on image data after conversion into CMYK data. Since, for example, yellow is a color which is not visually conspicuous, it is possible to further suppress the visual influence on the image by multiplexing on a yellow component. For example, if the number of colors is 10, when a color list for each color is 10×3×8=240 bits, a pixel count is 10×2×8=160 bits, and the total number of colors is 8 bits, the total amount is 408 bits. Since 1 bit is expressed by 8×8 pixels, an image is expressed by 51 regions. In this example, no gap is provided between the regions for positioning at the time of restoration. However, a gap may be provided depending on a restoration method. The same information may be repeatedly multiplexed. Furthermore, since as the number of colors increases, the information amount increases, the pixel count information for each color may be encoded and lossless compressed, and then multiplexed.

Color-Specific Pixel Count Information Extraction Processing

Subsequently, a color-specific pixel count extraction procedure will be described. In step S211 of FIG. 2B, a printed material on which color-specific pixel count data is multiplexed is read. First, a print document is set on a scanner device, and is read in step S211. More specifically, a scanner device is controlled to irradiate the document with LED light, and an image sensor such as a CCD facing each pixel converts reflected light into an analog electrical signal.

Next, in step S212, the analog electrical signal is digitized to input digital R, G, and B values. An arbitrary known method may be used for bitmap acquisition processing, but this embodiment will describe an example of using the following method. The following four processes are performed for each pixel of the bitmap image acquired in step S211 and formed by R, G, and B pixel values.

MTF correction
Input correction
Shading correction
Color conversion

In MTF (Modulation Transfer Function) correction, correction associated with the resolution of the reading performance of the scanner is performed.

More specifically, in reading by the scanner, since an image is blurred due to a deviation from a focus position, the performance limit of a lens itself, or the like, restoration is performed to some extent by filter processing or the like. In fact, if strong enhancement processing is performed such that the deterioration is completely restored, an adverse effect of the image such as enhancement of highlight detail loss or image noise/contaminated pixel is more conspicuous, and thus design is performed to keep the balance between the adverse effect and improvement of image quality. For the sake of descriptive simplicity, an example of an edge enhancement filter for multiplying pixel values in the central portion of the image by 5 and pixel values in the upper, lower, left, and right portions by −1 will be described below.

$R'[x][y]=R[x][y]\times 5-R[x-1][y]-R[x+1][y]-R[x][y-1]-R[x][y+1]$ $G'[x][y]=G[x][y]\times 5-G[x-1][y]-G[x+1][y]-G[x][y-1]-G[x][y+1]$ $B'[x][y]=B[x][y]\times 5-B[x-1][y]-B[x+1][y]-B[x][y-1]-B[x][y+1]$ Input correction is processing of converting the output value of the CCD, which is originally a photon quantity, into brightness suitable for human visual sensitivity. More specifically, for example, an R', G', or B' signal of 4,096 tones for each color is converted into a color intensity value R", G", or B" of 1,024 tones for each color. To do this, a one-dimensional lookup table Table4[4][4096] in which a preferable printing dot count rate for the density of each ink color is set is used to obtain:

$R''$=Table4[0][$R'$]

$G''$=Table4[1][$G'$]

$B''$=Table4[2][$B'$]

Thus, input correction can be implemented. Furthermore, a known contrivance to decrease a table size may be used. For example, the number of grids of the lookup table is decreased from 4,096 to, for example, 256, and an output value is decided by interpolating the table values of a plurality of grids.

Shading correction is processing of reducing color/density unevenness caused by a difference in reading sensitivity at each pixel position caused by the manufacturing variation or assembly variation of a lens, LED, or CCD forming the scanner device. More specifically, the R", G", or B" signal of 1,024 tones for each color is converted into the color intensity value R'", G'", or B'" of 256 tones for each color. To do this, with respect to the direction (X direction) in which the scanner lens is arranged, a one-dimensional lookup table Table5[X][3][1024] for density conversion for each X-pixel position is used to obtain:

$$R'''=\text{Table5}[x][0][R'']$$

$$G'''=\text{Table5}[x][1][G'']$$

$$B'''=\text{Table5}[x][2][B'']$$

Thus, shading correction can be implemented. Furthermore, a known contrivance to decrease a table size may be used. For example, the number of grids of the lookup table is decreased from 1,024 to, for example, 256, and an output value is decided by interpolating the table values of a plurality of grids.

Finally, color conversion processing is performed. In contrast to printing, the calculated values R'", G'", and B'" are values unique to the scanner device, and thus the color conversion processing is performed to obtain preferable values Rout, Gout, and Bout for display on the display. To do this, similar to color conversion at the time of printing, since each of the input values R'", G'", and B'" has 256 tones, a table Table6[256][256][256][3] having 16,777,216 (=256× 256×256) combinations of output values in total is prepared to obtain:

$$R\text{out}=\text{Table1}[R'''][G'''][B'''][0]$$

$$G\text{out}=\text{Table1}[R'''][G'''][B'''][1]$$

$$B\text{out}=\text{Table1}[R'''][G'''][B'''][2]$$

Thus, the color conversion processing can be implemented. Furthermore, a known contrivance to decrease a table size may be used. For example, the number of grids of the lookup table is decreased from 256 to, for example, 16, and an output value is decided by interpolating the table values of a plurality of grids.

Thus, the bitmap acquisition operation in step S212 ends.

Figure 4A:
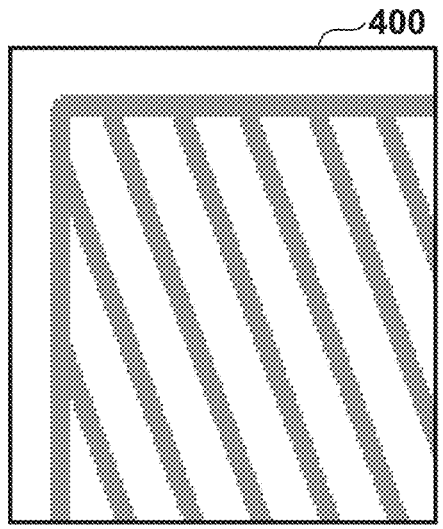
FIGS. 4A and 4B are views for explaining examples of adverse effects of an image caused by conventional printing and reading, respectively.
Figure 4B:
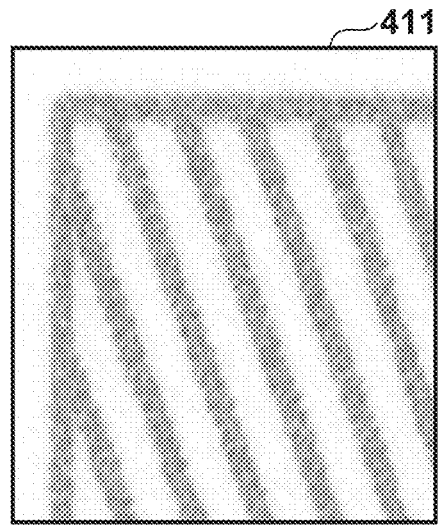

FIGS. 4A and 4B are views for explaining examples of adverse effects of an image caused by printing and reading, respectively. FIG. 4A shows the upper left portion of the object 301 in a state in which the PDL document shown in FIG. 3 is rendered, that is, the bitmap image output in step S202 of FIG. 2A.

FIG. 4B shows a portion corresponding to a position shown in FIG. 4A in the bitmap image acquired in step S212 of FIG. 2B by scanning the print document of the PDL document shown in FIG. 3.

As will be apparent by comparing FIGS. 4A and 4B, a straight line 400 shown in FIG. 4A has uniform density (R=128, G=128, and B=128) but a straight line 411 shown in FIG. 4B is nonuniform in density, and unevenness is conspicuous in the edge portion of the straight line. Furthermore, there exist pixels having slightly higher density around the straight line, and a background image is a slightly dark image as a whole. This is because in the bitmap image obtained by printing the PDL document and scanning it, image deterioration occurs for the PDL document, as follows.

Deterioration in shape caused by quantization performed in step S205 (a decrease in the number of tones caused by quantization)

Deterioration in shape caused by printing performed in step S206 (print accuracy/print sheet)

Deterioration in shape caused by scanning performed in step S211 (blurring caused by the scanner)

In fact, furthermore, the following is considered.

Deterioration in shape caused by deterioration such as contamination of the print document To cope with them, in this embodiment, the processes in step S213 and the subsequent step are executed to correct the deteriorated image, thereby suppressing a decrease in image quality obtained by the scan. In step S213, the multiplexed PDL file data is extracted. An overview of an example of bitmap image analysis will be described below.

Figure 13:
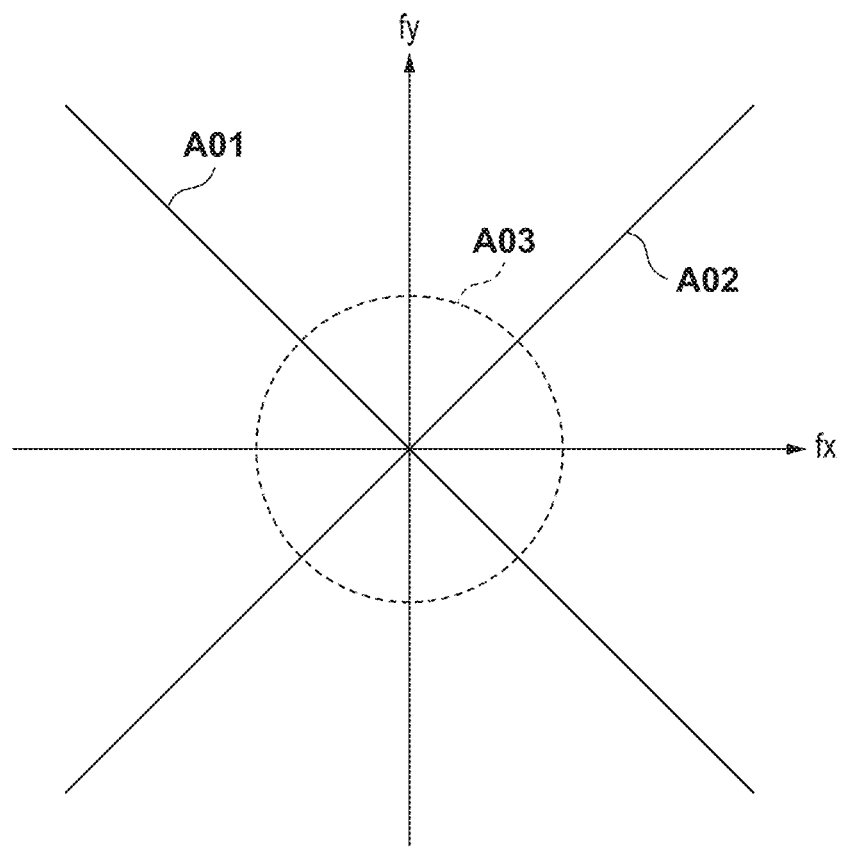
FIG. 13 is a view showing an example of the spatial frequency characteristic of an embedded pattern.

First, a position at which the multiplexed information (to also be referred to as additional information hereinafter) is embedded is detected from the image data. More specifically, an embedded position is detected by analyzing the spatial frequency characteristic of the image data. FIG. 13 is a view showing the spatial frequency characteristic of the pattern used for embedding the information. The abscissa represents the frequency in the horizontal direction, the ordinate represents the frequency in the vertical direction, and the frequency rises as it moves apart from the origin. In this embodiment, as shown in FIGS. 7A and 7B, the two patterns are embedded in the image. In the embedding example, 10 is added or subtracted to or from the B components among R, G, and B components. This causes the pattern shown in FIG. 7A to generate a large power spectrum in a line A01 shown in FIG. 13. Similarly, the pattern shown in FIG. 7B generates a large power spectrum in a line A02. By detecting this power spectrum for, for example, each region of 8×8 pixels, data of "0" or "1" is extracted. Note that by executing edge detection as preprocessing of detection, it is possible to enhance the power spectrum.

In data extraction by frequency analysis, it is necessary to accurately extract an analysis area from the image data, and thus processing of correcting the deviation of the coordinate position is performed. For example, extraction of a region of 8 pixels×8 pixels from the image and frequency analysis are repeated in the vertical and horizontal directions while shifting by one pixel in each of the vertical and horizontal directions. Then, these processes are repeated 64 times in total until 8 pixels are shifted in each of the horizontal and vertical directions, and a position at which the spectrum is largest is set as a reference position for extraction. In this case, a region to undergo frequency analysis is a region of 16 pixels×16 pixels, and if the region is within a region where the additional information is multiplexed without any gap, it should include at least one piece of additional information. Therefore, it is possible to decide the position of the region as a reference, as described above. After the completion of the position detection processing, the additional information is extracted in accordance with the multiplexing rule with reference to the position, thereby obtaining the embedded sequence of "0" and "1".

Note that if the head of the code region where the additional information is embedded is selected as a position in the image to specify the reference position by the above method, the specified reference position indicates the head of the code region. In other cases as well, since it is possible to roughly specify the position of the region, whose position is specified as a reference, in the multiplexed code string, it is possible to specify the head of the multiplexed code string with reference to the position. It is possible to specify the head of the region where the additional information is multiplexed, by analyzing the spatial frequencies with respect to the region of 8×8 pixels specified as the head and the preceding and succeeding regions of 8×8 pixels. Thus, since the length of the additional information may be fixed, the entire region where the additional information is multiplexed can be specified. The thus specified entire code region can be decoded into binary data by analyzing the spatial frequencies shown in FIG. 13.

Subsequently, in step S214, the color-specific pixel count data is extracted from the analysis result obtained in step S213. An overview of an example of data extraction will be described below.

Restoration Processing of Read Image

In this embodiment, as described with respect to step S204, a character code of additional information to be embedded is converted in advance, as text document data, into numerical values by, for example, "Shift JIS".

As described above, in a 1-byte code (half-width character) of Shift JIS, "h" corresponds to binary data of "01101000", "e" corresponds to binary data of "01100101", "l" corresponds to binary data of "01101100" and "o" corresponds to binary data of "01101111". Therefore, the numeric string of the extracted additional information is "0110100001100101011011000110110001101111", a character string "hello" is obtained.

In fact, the following information is extracted as the color-specific pixel count information embedded as additional information in step S204.

| | |
|---|---|
| •Total color count | N |
| •Color list | Col[N][3] |
| •Each color pixel count | Num[N] |

Then, the processing in step S214 ends.

Figure 9:
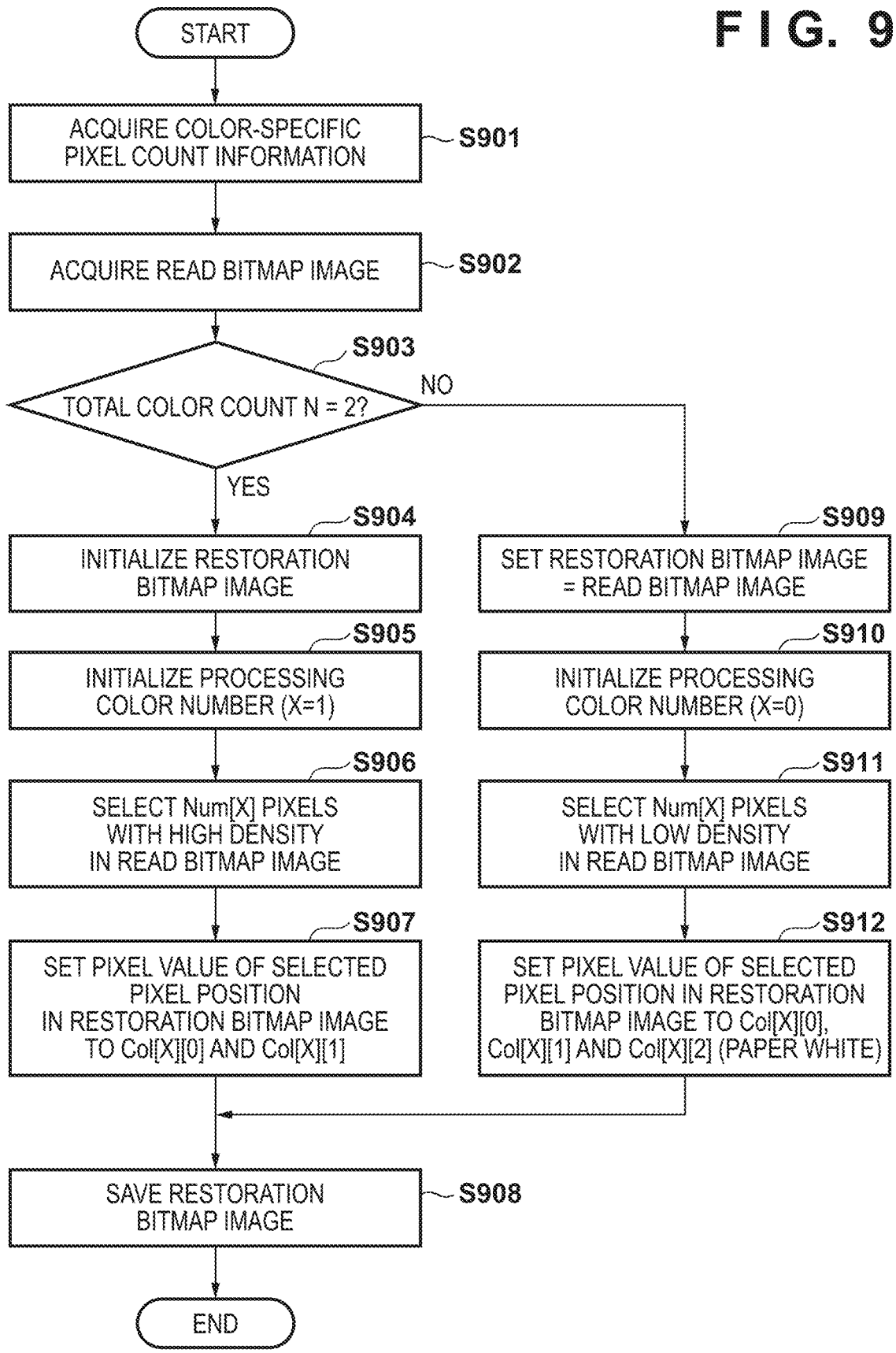
FIG. 9 is a flowchart for explaining a read bitmap image restoration procedure according to the first embodiment.

Subsequently, in step S215, the read bitmap image read by the scanner is restored using the extracted color-specific pixel count data, thereby generating a restored bitmap image (to also be referred to as a restoration bitmap image hereinafter). FIG. 9 is a flowchart for explaining the read bitmap image restoration processing procedure. In step S901, the color-specific pixel count information obtained in step S213 of FIG. 2B is acquired.

In step S902, the read bitmap image obtained in step S212 of FIG. 2B is acquired.

In step S903, the total color count is determined. This embodiment assumes that the following two restoration processes are performed. That is, if the color count is two (paper white+one color), the process branches to step S904, and if the color count is three or more (paper white+two or more colors), the process branches to step S909. More specifically, the determination processing in step S903 is performed by determining whether the total color count is two. If the determination result in step S903 is "YES", restoration for two colors (paper white+one color) is performed in steps S904 to S907.

First, in step S904, the restoration bitmap image is initialized. More specifically, all the pixels are set to paper white (R=G=B=255). Next, in step S905, a processing color number is initialized (X=1). The reason why the initial value of the color number is set to 1 is that initialization is performed in step S904 with respect to paper white of the color number of 0.

Next, in step S906, in the read bitmap image, Num[X] (more specifically, Num[1]) pixels (color number of 1) with high density are selected. This is based on the idea that since it is originally confirmed that the document includes two colors (paper white+one color), a pixel with higher density (≈ lower brightness) than paper white highly probably has the additional one color.

As a method of selecting pixels from the read bitmap image, for example, the following method may be adopted. In step S906, since the read bitmap image includes a single color, it is converted into image data of a luminance or density component, and Num[1] pixels are selected sequentially from a pixel with the lowest luminance or highest density. A pixel with the lowest luminance or highest density can be regarded as a pixel of a color closest to the color X. Note that the positions of the selected pixels are saved. More specifically, the pixels of the read bitmap image converted into the image data of the luminance or density component are sequentially focused on in a raster order, and the color difference between the pixel of interest and the color of the color number of 1 is obtained, thereby sorting pieces of information indicating the pixel positions in ascending order of the color difference. The color difference can be regarded as the distance between two colors in the color space. Alternatively, the pixels of interest may be sorted in descending order of the density or ascending order of the luminance. Upon completion of the sort of the pixels of the entire read bitmap image, Num[X] pixels are selected from the first pixel. At this time, for example, filter processing of extracting the contour of the image is performed in advance, and the above processing may be executed for the inside of the contour instead of the entire image. Other methods can be adopted, as a matter of course.

Next, in step S907, the pixels, in the restoration bitmap image, corresponding to the pixel positions selected in step S906 are overwritten by the R, G, and B values of the color number of 1 in the color list. This forms the restoration bitmap image by one of paper white and the color of the color number of 1. Therefore, the read image in the state shown in FIG. 4B can be made close to that shown in FIG. 4A.

Next, in step S908, the restoration bitmap image is saved, and the process returns to the procedure shown in FIG. 2B. Referring back to FIG. 2B, the restoration bitmap image is saved in step S216, and then the process ends.

If the determination result in step S903 is "NO", restoration of one color (paper white) is performed in steps S909 to S912. In this embodiment, this is done to restore a blur of the edges of characters/thin lines and the like by surely setting paper white with respect to at least paper white pixels.

First, in step S909, the read bitmap image is set as a restoration bitmap image. In this example, the read bitmap image is used as a restoration bitmap image or is copied as a restoration bitmap image. Next, in step S910, the processing color number is initialized. More specifically, the color number of 0 of paper white is set.

Next, in step S911, in the read bitmap image, Num[X] (that is, Num[0]) pixels of the color X (in this example, X=0, that is, paper white) with low density are selected. This is based on the idea that since it is originally confirmed that the document includes three or more colors (paper white+two or more colors), a pixel with lower density (≈higher brightness) is highly probably paper white.

As a method of selecting pixels from the read bitmap image, the same method as in step S906 may be used in principle. For example, in step S911, the read bitmap image is converted into an image of a single color, and converted into image data of a luminance or density component, and then Num[0] pixels are selected from the pixel with the highest luminance or lowest density. A pixel with the highest luminance or lowest density can be regarded as a pixel of a color closest to color 0 (paper white). Note that the positions of the selected pixels are saved. More specifically, the pixels of the read bitmap image converted into the image data of the luminance or density component are sequentially focused on in a raster order, and the color difference between the pixel of interest and the color (paper white) of the color number of 0 is obtained, thereby sorting pieces of information indicating the pixel positions in ascending order of the color difference. Upon completion of the sort of the pixels of the entire read bitmap image, Num[0] pixels are selected from the first pixel. At this time, for example, filter processing of extracting the contour of the image is performed in advance, and the above processing may be executed for the inside of the contour instead of the entire image. Other methods can be adopted, as a matter of course. Note that this example assumes, as white, the ground color of the sheet to be scanned. To the contrary, if an image of a sheet of a color other than white is formed, correction processing of combining the ground color of the sheet with the color of the color number of 0 is performed before step S911, and the color after the correction processing is used in step S911 instead of the color of the color number of 0.

Next, in step S912, the pixels, in the restoration bitmap image, corresponding to the pixel positions selected in step S911 are overwritten by the R, G, and B values (paper white) of the color number of 0 in the color list. As described in step S911, in step S912 as well, the pixels may be overwritten using the color of the color number of 0 after the correction processing. This improves the restoration accuracy of paper white in the restoration bitmap image, and clarify the boundaries between the ground color (for example, paper white) and another color, thereby improving the image quality. Therefore, the read image in the state shown in FIG. 4B can be made close to that shown in FIG. 4A. Note that in this example, since only the color of the color number of 0 is referred to for restoration of the image, in step S204 as well, if the color count is three or more, the brightest color is given with a color number of 0 and the respective color component values and the pixel count of the color may be multiplexed and printed.

Next, the restoration bitmap image is saved in step S908, the processing of restoring the image in step S215 is completed, and then the process returns to the procedure shown in FIG. 2B. Referring back to FIG. 2B, the restoration bitmap image is saved in step S216, and then the process ends.

As described above, the color-specific pixel count data is extracted from the scan image of the printed material, and the read bitmap image is corrected based on the information and restored, thereby making it possible to acquire an image in which image deterioration caused by printing and scanning has been reduced. By re-executing printing based on the restored image, it is possible to make a copy with reduced image deterioration. Furthermore, in this embodiment, if the document includes colors the number of which falls within the range of 3 (inclusive) to Max (exclusive), only paper white pixels are restored. However, similar to the case in which the document includes two colors, the pixel colors other than paper white may be restored. More specifically, the color difference between each pixel value and each color described in the color list is calculated, and a color in the original document is estimated for each color in ascending order of the difference.

If the color count of the document is Max, the color count may actually be equal to or larger than Max, and thus restoration of paper white described in steps S909 to S912 of FIG. 9 according to this embodiment is preferably performed from the viewpoint of avoiding an adverse effect of the image. Although not illustrated in FIG. 9, even if the document is a document of a single color of paper white, it is possible to restore the paper white document by the procedure described in steps S909 to S912.

Note that in this embodiment, the multi function printer having the scanner and printer functions has been exemplified. However, independent apparatuses of a printer that multiplexes information and a scanner that restores the multiplexed information may be used. The same applies to other embodiments. This may also be implemented by an information processing apparatus connected to a printer and a scanner.

[Other Examples of Multiplexing Method]

The example of embedding information for every 8×8 pixels has been explained with reference to FIGS. 6A, 5B, 7A, and 7B. This is an example of embedding an image in a high-frequency region so that it is difficult for the user to visually recognize the image. However, in addition to multiplexing on the high-frequency region, an arbitrary multiplexing method may be performed.

FIGS. 8A and 8B show another example of a multiplexing method. FIG. 8A shows an example of a pattern of a QR Code® as one of matrix two-dimensional codes. In this example, a QR code is generated from PDL file data, and is multiplexed on a printed material in a form difficult to visually recognize. FIG. 8B shows an actual print pattern, which is a pattern obtained by printing only one dot for every 8×8 pixels. A dot corresponding to a black pixel in 800 of FIG. 8A corresponds to one dot in 801 of FIG. 8B. No dot is formed in FIG. 8B at a position corresponding to a blank pixel in FIG. 8A.

This can form, on a print sheet, a multiplexing pattern difficult to visually recognize. More specifically, in step S203 of FIG. 2A, a QR code is generated from the PDL file data, as shown in FIG. 8A, and is then superimposed, on the rendering image, as print data shown in FIG. 8B as separated dots. Since, as ink forming the separated dots, yellow ink is most difficult to visually recognize, the pattern shown in FIG. 8B is formed by yellow ink, thereby making it possible to form, on the print sheet, the multiplexing pattern which is more difficult to visually recognize. The original image may include a yellow component, but interference by the yellow component of the original image data in the region of the QR code can be prevented by replacing the yellow component by the pattern shown in FIG. 8B corresponding to the QR code. This can restore the image from the QR code as described in the PDL data.

In the case of this multiplexing method, in the multiplexed image analysis in step S213, it is determined, for every 8×8 pixels in the read bitmap image, whether a yellow dot is printed. Then, the QR code pattern corresponding to FIG. 8A is reconstructed from the pattern of the yellow component shown in FIG. 8B, and then decoded. This extracts the PDL file data. At the time of reconstruction, the 8×8 region including the yellow dot is replaced by one black cell of the QR code. Note that information to be multiplexed may be pixel count information for each color, similar to the first embodiment. In this case, a QR code is generated from the color-specific pixel count information, and is multiplexed on the image data, as shown in FIG. 8B.

Note that if one QR code has an insufficient capacity, the PDL data may be divided and encoded in a plurality of QR codes, and then multiplexed. In this case, the QR code to be embedded at the start position may include a division number.

As another multiplexing example, there is provided a method of performing threshold modulation at the time of quantization processing in the print image generation processing in step S204 of FIG. 2A, and performing multiplexing (Japanese Patent No. 4187749). This method may be used.

The various multiplexing examples have been described above. In general, if an information amount to be multiplexed increases, it is necessary to increase the printing dot count or a modulation amount, resulting in an increase in image deterioration of the entire print image.

As described above, since the document page 300 shown in FIG. 3 is formed with a width of 600 pixels and a height of 900 pixels, one page is formed by 540,000 pixels as a whole. When the color of each pixel is represented by 256 tones for R, G, and B components each formed by 8 bits, each pixel has a size of 3 bytes and one page has a size of 1,620,000 bytes 1.6 Mbytes in total. On the other hand, a file size in the PDL format is 106,200 bytes, and is about 6.6% of the above size. The breakdown of calculation of the file size is as follows.

Drawing command portion: about 350 characters (≈700 bytes when one character has a size of 2 bytes).

"PORTRAIT.jpg": 427,500 bytes in total when the file has a size of 300×475 pixels and each pixel has a size of 3 bytes. When a compression ratio is 20%, a size of 85,500 bytes is obtained.

"STD" font data: 20,000 bytes assumed for reasons to be described later.

In this example, as an example of the font size, calculation is performed based on the information disclosed in Japanese Patent Laid-Open No. 2008-186165. Japanese Patent Laid-Open No. 2008-186165 describes, as follows.

"When performing calculation for 20 pages, the PDL size without font embedding is about 60 KB while the PDL size with font embedding is 460 KB which is a nearly 900% increase. (Calculation is performed by assuming that new characters per page account for 75%.)"

A font embedding amount for one page is assumed to be 400 Kbytes/20=20 Kbytes.

To the contrary, in this embodiment, the embedded data amount is as follows.

| Color Count | 2 colors | 3 colors | 4 colors | 10 colors |
| --- | --- | --- | --- | --- |
| N | 1 byte | 1 byte | 1 byte | 1 byte |
| Col[N][3] | 6 bytes | 9 bytes | 12 bytes | 30 bytes |
| Num[N] | 4 bytes | 6 bytes | 8 bytes | 20 bytes |
| Total | 11 bytes | 16 bytes | 21 bytes | 51 bytes |

Even if pieces of color-specific pixel count information for 10 colors are held, the data amount is extremely small, as follows.
With respect to bitmap data 1/30,000 or less
With respect to PDF data 1/2,000 or less Therefore, when multiplexing on a print document, it is possible to significantly reduce image deterioration of the entire print image caused by multiplexing by multiplexing not the bitmap image or the PDL file but the color-specific pixel count information.

Second Embodiment

The first embodiment has explained the example of acquiring color-specific pixel count data with respect to the entire document (that is, the entire image data). However, in this case, if the document partially includes an image including a large number of colors, such as a photo image, it is difficult to restore colors other than paper white. To cope with this, this embodiment will describe an example of dividing a document into a plurality of tiles, and embedding color-specific pixel count data for each tile and extracting it.

Figure 10:
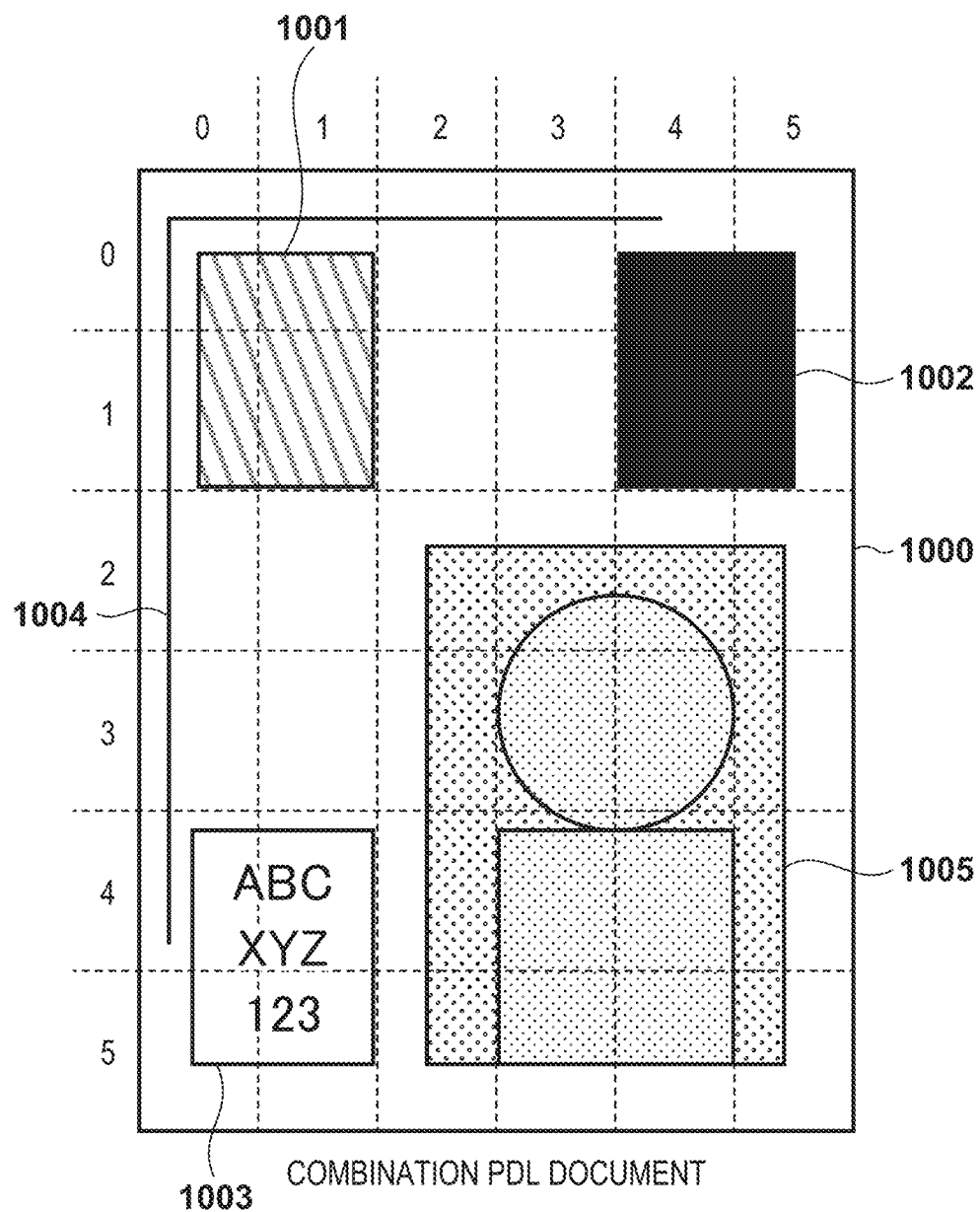
FIG. 10 is a view for explaining an example of a multiplexing PDL document according to the second embodiment.

FIG. 10 shows an example of tile division of a document according to this embodiment. Reference numerals 1000 to 1005 in FIG. 10 correspond to reference numerals 300 to 305 in FIG. 3, respectively, and a description thereof will be omitted. The document 1000 shown in FIG. 10 is divided into six portions in each of the horizontal and vertical directions, and is divided into 36 tiles as a whole. Each tile is formed with a width of 120 pixels and a height of 150 pixels. In this embodiment, a tile existing at a position X in the horizontal direction and a position Y in the vertical direction is represented as tile XY.

For example, the tiles are as follows.

Tile 00 black line drawing×2, oblique line box drawing×1→color count 3

Tile 40 black line drawing×1, black solid box drawing×1→color count 2

Tile 22 image drawing×1→color count Max

In the method according to the first embodiment, it is difficult to restore colors other than paper white since a natural image exists in tiles 22 to 55 and the color count of the entire document is thus Max.

In this embodiment, however, with respect to at least tile portions of tiles 02, 03, 04, 05, 11, 14, 15, 20, 30, 40, 41, 50, and 51, it is possible to restore two colors (paper white+one color). With respect to tile portions of tiles 00, 01, and 10 as well, it is possible to restore three colors (paper white+two colors).

Figure 11A:
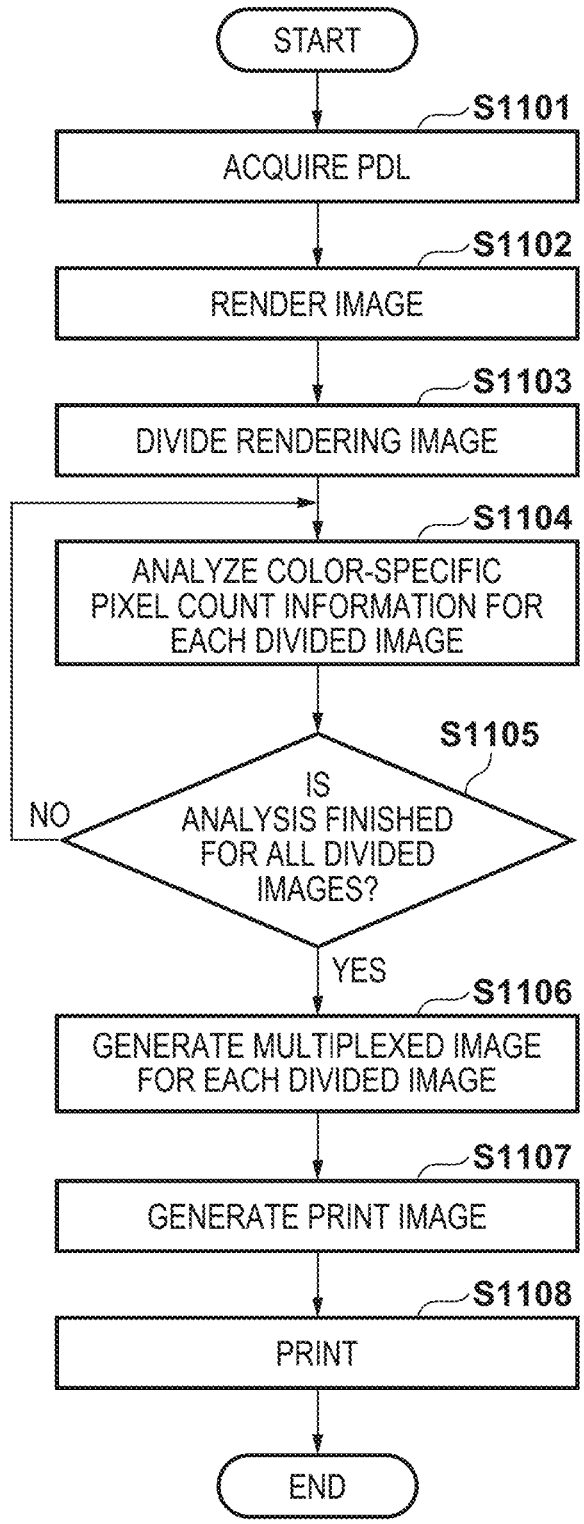
FIGS. 11A and 11B are flowcharts for explaining a multiplexing PDL generation procedure according to the second embodiment.
Figure 11B:
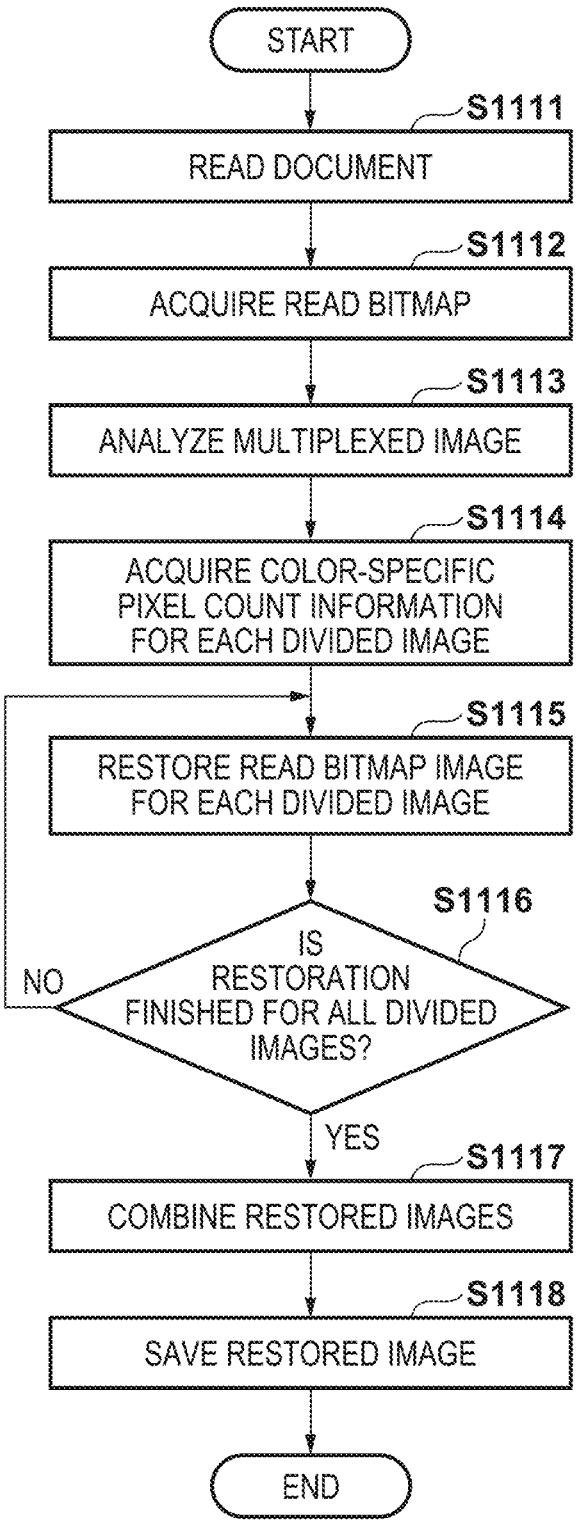

FIGS. 11A and 11B show a color-specific pixel count information multiplexing/restoration processing procedure according to this embodiment. Processes in steps S1101 to S1108 of FIG. 11A correspond to a color-specific pixel count information multiplexing procedure, and processes in steps S1111 to S1118 of FIG. 11B correspond to a color-specific pixel count information restoration procedure. The processes in steps S1101 and S1102 are the same as those in steps S201 and S202 of FIG. 2 and a description thereof will be omitted.

Next, in step S1103, as described above, a rendered image is divided into a plurality of tiles, for example, 36 (=6×6) tiles. The division number is arbitrary but is preferably larger since as the division number is larger, the restorability is improved. However, as the division number is larger, the amount of data which needs to be embedded is larger as a whole. Therefore, the division number is preferably set in consideration of the balance between image deterioration caused by an increase in embedding amount and improvement of the restorability.

In step S1104, the color-specific pixel count information is analyzed for each divided image. Detailed processing is the same as the procedure shown in FIG. 5 except that the image processing unit is changed from the entire image to each tile, and a description thereof will be omitted.

In step S1105, it is determined whether analysis of all the divided images ends. If the determination result is "NO", the processing target is updated with the next tile, and the process returns to step S1104 to continue the processing. If the determination result in step S1105 is "YES", the process advances to step S1106.

In step S1106, a multiplexed image is generated for each divided image tile. In this embodiment, the analysis result of the color-specific pixel count information of tile 00 is embedded in the image of tile 00. The multiplexing processing is the same as that in step S204 of FIG. 2 and a description thereof will be omitted. The processes in steps S1107 and S1108 are the same as those in steps S205 and S206 of FIG. 2 and a description thereof will be omitted.

As described above, the color-specific pixel count information for each divided tile is embedded in a print image. Next, restoration of the color-specific pixel count information for each divided tile will be described. Steps S1111 to S1113 are the same as steps S211 to S213 of FIG. 2 and a description thereof will be omitted.

In step S1114, the color-specific pixel count information multiplexed for each divided image is extracted. The extraction processing is the same as that in step S214 of FIG. 2 and a detailed description thereof will be omitted.

In step S1115, a read bitmap image is restored for each divided image. A restoration method is the same as the procedure shown in FIG. 9 except that tile XY is restored using the color-specific pixel count information of tile XY extracted from a read image of tile XY, and a description thereof will be omitted.

In step S1116, it is determined whether restoration of all the divided images ends. If the determination result is "NO", the processing target is updated with the next tile, and the process returns to step S1115 to continue the processing. If the determination result is "YES", the process advances to step S1117. Next, in step S1117, all the restored tile images are combined to generate an image of the entire document. The process advances to step S1118 to save the restored image, thereby ending the processing.

As described above, for each divided tile, a read image is restored using the read image and color-specific pixel count information extracted from the read image. In a document which partially includes a large number of colors and partially includes a small number of colors, by performing the above-described processing, it is possible to make a deteriorated image caused by printing and reading close to the original image in a portion including a small number of colors.

Third Embodiment

The second embodiment has explained the example of multiplexing, on each tile, the color-specific pixel count information of the tile. Since, however, the difficulty of embedding information is different depending on the image status for each tile, the degree of restoration of a deteriorated image may be low in a tile whose difficulty of embedding is high, such as a black solid image. Furthermore, even in a tile in which there is no paper white and the color count exceeds Max like a photo image region, pieces of color-specific pixel count information the number of which is Max are embedded, and thus the embedded data are difficult to contribute to restoration.

To cope with this, in this embodiment, the following example of the arrangement will be described.

On each tile, pieces of color-specific pixel count information of tiles other than the tile are multiplexed.

Color-specific pixel count information of a tile that is considered not to obtain the restoration effect is not embedded.

Figure 12:
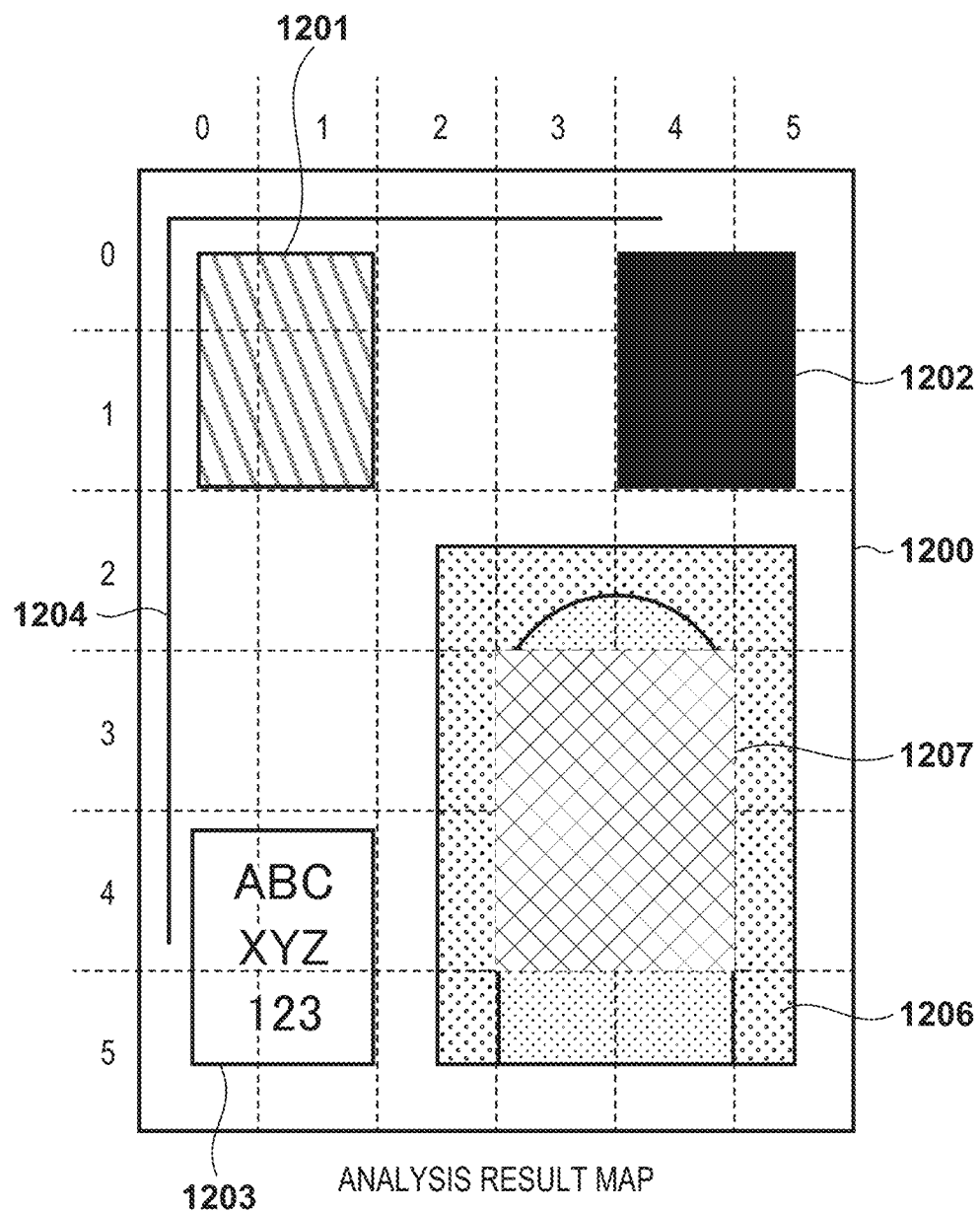
FIG. 12 is a view for explaining an example of a tile division PDL document according to the third embodiment.

FIG. 12 shows an example of an analysis result at the time of dividing a document into tiles according to this embodiment. In FIG. 12, documents 1200 to 1206 are the same as the documents 1000 to 1006 shown in FIG. 10 and a description thereof will be omitted. In FIG. 12, a hatching region 1207 indicates "a tile where the restoration effect of a deteriorated image cannot be obtained since there is no paper white and the number of colors is large.

A processing procedure is the same as that shown in FIGS. 11A and 11B according to the second embodiment, and processing unique to this embodiment in multiplexing processing is as follows.

As a result of analysis in step S1103, the color-specific pixel count information of a tile that satisfies the following conditions is not embedded:

paper white pixel count Num[0]≤Th (threshold)   Condition 1:

total color count $N$=Max   Condition 2:

Color-specific pixel count information multiplexed in step S1114 is information of target tile+information of adjacent tile More specifically, Th (threshold) is about 1% (since the tile pixel count is 18,000 pixels, Th is 180 pixels). Note that satisfying one of conditions 1 and 2 may be used as a condition for not embedding the color-specific pixel count information in the tile.

In the document shown in FIG. 12, some of the pieces of color-specific pixel count information to be embedded in each tile are as follows.

Embedding in the image of tile 00←pieces of color-specific pixel count information of tiles 00, 10, and 01

Embedding in the image of tile 11←pieces of color-specific pixel count information of tiles 10, 01, 11, 21, and 12

Embedding in the image of tile 22←pieces of color-specific pixel count information of tiles 21, 12, 22, 32, and 23

Embedding in the image of tile 33←pieces of color-specific pixel count information of tiles 32 and 23

Embedding in the image of tile 44←pieces of color-specific pixel count information of tiles 54 and 45

Embedding in the image of tile 55←pieces of color-specific pixel count information of tiles 54, 45, and 55

In this example, pieces of information of tiles of one column are embedded in one (in this example, the leftmost end) of the tiles of the column. At this time, since the pieces of color-specific pixel count information of a plurality of tiles are embedded in one tile, the format of the embedded information is preferably decided, as follows, to discriminate the information of a specific tile.

| Color Count | 2 colors | 3 colors | 4 colors | 10 colors |
|---|---|---|---|---|
| Position (XY) | 2 bytes | 2 bytes | 2 bytes | 2 bytes |
| N | 1 byte | 1 byte | 1 byte | 1 byte |

-continued

| Color Count | 2 colors | 3 colors | 4 colors | 10 colors |
|---|---|---|---|---|
| Col[N][3] | 6 bytes | 9 bytes | 12 bytes | 30 bytes |
| Num[N] | 4 bytes | 6 bytes | 8 bytes | 20 bytes |
| Total | 13 bytes | 18 bytes | 23 bytes | 53 bytes |

In this way, for example, even if there is a region difficult to multiplex because of a black solid image like tile 41, the color-specific pixel count information of tile 41 is also embedded in four tiles 40, 31, 51, and 42, and thus it is possible to reduce image deterioration caused when the information is forcibly embedded.

Furthermore, in this embodiment, the information is embedded in an adjacent tile. However, other methods are possible, as follows.

The information is preferentially embedded in a white solid tile (tile 21, 31, 12, or 13) in which embedding is easy The pieces of color-specific pixel count information of all the tiles are embedded in each tile image.

"Color-specific pixel count information" according to the present invention has an extremely small data amount, as compared with any of other image information, font information, and character string information. Thus, even if the information of another tile is embedded, the embedded data amount can be sufficiently small.

Furthermore, processing unique to this embodiment at the time of restoration is as follows.

When acquiring the color-specific pixel count information in step S1114, the color-specific pixel count information extracted from an adjacent tile is used for restoration processing of the target tile.

No restoration processing is performed for a tile from which the color-specific pixel count information cannot be extracted.

As described above, by using this embodiment, even for an image in which it is difficult to embed information or a document in which it is difficult to obtain the effect of embedding information, it is possible to embed appropriate information and make a deteriorated image caused by printing and reading close to the original document.

Furthermore, in the above-described three embodiments, it is possible to obtain the same effect using an occupancy, as follows. With respect to a portion described to have the pixel count N, the pixel occupancy is given by "N/total pixel count of region".

With respect to color information as well, it is possible to obtain the same effect as in the above embodiments using any color information such as CMYK, Lab, or grayscale instead of RGB. A PDL document has been exemplified as a document. However, even if a bitmap image is used, if the number of colors of the image is sufficiently small, it is possible to obtain the same effect as in the above embodiments.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-039529, filed Mar. 11, 2021 which is hereby incorporated by reference herein in its entirety.

What is claimed is:

1. An information processing apparatus connected to an image forming unit configured to form an image based on image data and a reading unit configured to read an image as image data, the information processing apparatus comprising one or more processors and one or more memories comprising one or more programs, wherein the one or more programs are configured to cause the one or more processors to acquire a pixel count, concerning at least one color component, of image data formed by pixels, encode the at least one color component and the pixel count to be multiplexed on the image data, output the image data to the image forming unit, restore the multiplexed at least one color component and the multiplexed pixel count from the image data read by the reading unit, and replace, by pixels of the at least one color component restored from the image data, the pixels of the pixel count, restored from the image data, of a color component corresponding to the at least one color component included in the image data and restored from the image data.

2. The apparatus according to claim 1, wherein the image data includes a single color, and the at least one color component is a color component of a single color.

3. The apparatus according to claim 1, wherein the image includes a plurality of color components, and the at least one color component is one of the plurality of color components.

4. The apparatus according to claim 1, wherein the pixel count is a pixel count of the at least one color component in the entire image data.

5. The apparatus according to claim 1, wherein the pixel count is a pixel count of the at least one color component in each of a plurality of regions obtained by dividing the image data.

6. The apparatus according to claim 5, wherein the at least one color component and the pixel count are multiplexed on a corresponding region.

7. The apparatus according to claim 5, wherein the at least one color component and the pixel count in each of the plurality of regions are multiplexed on one region.

8. The apparatus according to claim 1, wherein in the replacing, pixels of the restored pixel count, in accordance with color differences in a color space from the restored at least one color component, are replaced by the at least one color component.

9. The apparatus according to claim 1, wherein the at least one color component and the pixel count are encoded and multiplexed on a high-frequency component of the image.

10. The apparatus according to claim 1, wherein the at least one color component and the pixel count are encoded and multiplexed on a predetermined color component of the image.

11. The apparatus according to claim 1, wherein the at least one color component and the pixel count are encoded in a matrix two-dimensional code, and multiplexed on the image by replacing a pixel of a corresponding predetermined color component in the matrix two-dimensional code.

12. The apparatus according to claim 1, further comprising an image forming unit.

13. The apparatus according to claim 1, further comprising a reading unit.

14. An information processing apparatus connected to an image forming unit configured to form an image based on image data, the information processing apparatus comprising one or more processors and one or more memories comprising one or more programs, wherein the one or more programs are configured to cause the one or more processors to
acquire a pixel count, concerning at least one color component, of image data formed by pixels,
encode the at least one color component and the pixel count to be multiplexed on the image data, and
output the image data to the image forming unit.

15. An information processing apparatus connected to a reading unit configured to read, as image data, an image on which at least one color component and a pixel count of the color component are multiplexed, the information processing apparatus comprising one or more processors and one or more memories comprising one or more programs, wherein the one or more programs are configured to cause the one or more processors to
restore the multiplexed at least one color component and the multiplexed pixel count from the read image data, and
replace, by pixels of the at least one color component restored from the image data, the pixels of the pixel count, restored from the image data, of a color component corresponding to the at least one color component included in the image data and restored from the image data.

16. A non-transitory computer-readable medium storing at least one program, wherein the at least one program is configured to cause a computer, connected to an image forming unit configured to form an image based on image data and a reading unit configured to read an image as image data, to
acquire a pixel count, concerning at least one color component, of image data formed by pixels,
encode the at least one color component and the pixel count to be multiplexed on the image data,
output the image data to the image forming unit,
restore the multiplexed at least one color component and the multiplexed pixel count from the image data read by the reading unit, and
replace, by pixels of the at least one color component restored from the image data, the pixels of the pixel count, restored from the image data, of a color component corresponding to the at least one color component included in the image data and restored from the image data.

17. A non-transitory computer-readable medium storing at least one program, wherein the at least one program is configured to cause a computer, connected to an image forming unit configured to form an image based on image data, to
acquire a pixel count, concerning at least one color component, of image data formed by pixels,
encode the at least one color component and the pixel count to be multiplexed on the image data, and
output the image data to the image forming unit.

18. A non-transitory computer-readable medium storing at least one program, wherein the at least one program is configured to cause a computer, connected to a reading unit configured to read, as image data, an image on which at least one color component and a pixel count of the color component are multiplexed, to
restore the multiplexed at least one color component and the multiplexed pixel count from the read image data, and
replace, by pixels of the at least one color component restored from the image data, the pixels of the pixel count, restored from the image data, of a color component corresponding to the at least one color component included in the image data and restored from the image data.

19. An image processing method executed by an information processing apparatus connected to an image forming unit configured to form an image based on image data and a reading unit configured to read an image as image data, the method comprising:
causing an acquisition unit to acquire a pixel count, concerning at least one color component, of image data formed by pixels;
causing a multiplexing unit to encode the at least one color component and the pixel count to be multiplexed on the image data;
causing an output unit to output the image data to the image forming unit;
causing a restoration unit to restore the multiplexed at least one color component and the multiplexed pixel count from the image data read by the reading unit; and
causing a replacement unit to replace, by pixels of the at least one color component restored from the image data, the pixels of the pixel count, restored from the image data, of a color component corresponding to the at least one color component included in the image data and restored from the image data.

20. An image processing method executed by an information processing apparatus connected to an image forming unit configured to form an image based on image data, the method comprising:
causing an acquisition unit to acquire a pixel count, concerning at least one color component, of image data formed by pixels;
causing a multiplexing unit to encode the at least one color component and the pixel count to be multiplexed on the image data; and causing an output unit to output the image data to the image forming unit.

21. An image processing method executed by an information processing apparatus connected to a reading unit configured to read, as image data, an image on which at least one color component and a pixel count of the color component are multiplexed, the method comprising:

causing a restoration unit to restore the multiplexed at least one color component and the multiplexed pixel count from the read image data; and causing a replacement unit to replace, by pixels of the at least one color component restored from the image data, the pixels of the pixel count, restored from the image data, of a color component corresponding to the at least one color component included in the image data and restored from the image data.

* * * * *